United States Patent
Wu

(10) Patent No.: US 10,419,262 B2
(45) Date of Patent: Sep. 17, 2019

(54) DATA TRANSMISSION METHOD AND APPARATUS

(71) Applicant: HUAWEI TECHNOLOGIES CO., LTD., Shenzhen, Guangdong (CN)

(72) Inventor: Tao Wu, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 15/975,720

(22) Filed: May 9, 2018

(65) Prior Publication Data

US 2018/0262381 A1 Sep. 13, 2018

Related U.S. Application Data

(63) Continuation of application No. PCT/CN2016/104305, filed on Nov. 2, 2016.

(30) Foreign Application Priority Data

Nov. 13, 2015 (CN) .......................... 2015 1 0780892

(51) Int. Cl.
*H04B 7/08* (2006.01)
*H04L 27/34* (2006.01)
(Continued)

(52) U.S. Cl.
CPC .......... *H04L 27/34* (2013.01); *H04B 7/0456* (2013.01); *H04B 7/08* (2013.01); *H04B 7/12* (2013.01);
(Continued)

(58) Field of Classification Search
USPC ........................................................ 375/298
See application file for complete search history.

(56) References Cited

U.S. PATENT DOCUMENTS 7,499,020 B2 3/2009 Kurashima et al.
10,128,899 B2 * 11/2018 Murakami ............. H04B 1/707
(Continued)

FOREIGN PATENT DOCUMENTS

CN 1717889 A 1/2006
CN 101471757 A 7/2009
(Continued)

OTHER PUBLICATIONS

Jangyong Park et al.,"A Low Complexity Soft-Output Detection Algorithm for 2×2 Multiple-Input Multiple-Output Multiband-OFDM Systems Using Dual Carrier Modulation",IEEE Transactions on Consumer Electronics,dated Aug. 2014,total 9 pages.
(Continued)

*Primary Examiner* — Eva Y Puente
(74) *Attorney, Agent, or Firm* — Womble Bond Dickinson (US) LLP

(57) ABSTRACT

Embodiments of the present invention provide a data transmission method and apparatus, and the method includes: modulating to-be-sent information bits according to a lower order constellation diagram, and generating 4 m lower order modulation symbols; multiplying a precoding matrix Q by a column vector including every four lower order modulation symbols in the 4 m lower order modulation symbols, to obtain 4 m to-be-sent higher order modulation symbols corresponding to a higher order constellation diagram; and respectively and correspondingly sending the 4 m to-be-sent higher order modulation symbols on different carriers of two antennas. The to-be-sent higher order modulation symbols include some or all to-be-sent information bits. Therefore, the same signal can be simultaneously sent on different carriers of multiple antennas, and frequency diversity and space diversity are implemented, so that transceiving performance of data transmission is improved.

18 Claims, 13 Drawing Sheets

(51) Int. Cl.
  *H04L 1/06* (2006.01)
  *H04L 25/03* (2006.01)
  *H04B 7/0456* (2017.01)
  *H04B 7/12* (2006.01)
  *H04L 27/26* (2006.01)

(52) U.S. Cl.
  CPC ...... *H04L 1/0606* (2013.01); *H04L 25/03898* (2013.01); *H04L 27/2602* (2013.01); *H04L 27/3488* (2013.01)

(56) References Cited

U.S. PATENT DOCUMENTS

| | | | |
|---|---|---|---|
| 10,134,412 B2* | 11/2018 | Mamola | G10L 19/167 |
| 10,135,535 B2* | 11/2018 | Riani | H04B 10/27 |
| 2004/0081131 A1 | 4/2004 | Walton et al. | |
| 2005/0195765 A1* | 9/2005 | Sharon | H04B 1/7176 370/330 |
| 2008/0267158 A1 | 10/2008 | Zhang et al. | |
| 2008/0317168 A1 | 12/2008 | Yang et al. | |
| 2009/0028264 A1 | 1/2009 | Zhang et al. | |
| 2010/0285254 A1 | 11/2010 | Sakabe et al. | |
| 2011/0033004 A1 | 2/2011 | Wang et al. | |
| 2013/0254617 A1 | 9/2013 | Shinohara et al. | |
| 2014/0040707 A1 | 2/2014 | Shinohara et al. | |

FOREIGN PATENT DOCUMENTS

| | | |
|---|---|---|
| CN | 101521514 A | 9/2009 |
| CN | 102007747 A | 4/2011 |
| CN | 102857290 A | 1/2013 |
| EP | 2222009 A1 | 8/2010 |
| JP | 2009-521827 A | 6/2009 |
| JP | 2013066208 A | 4/2013 |
| RU | 2523190 C1 | 7/2014 |
| WO | 20091016573 A2 | 2/2009 |
| WO | 2009084483 A1 | 7/2009 |
| WO | 2009084837 A2 | 7/2009 |
| WO | 2009113008 A1 | 9/2009 |
| WO | 2012029614 A1 | 3/2012 |
| WO | 2012147623 A1 | 11/2012 |

OTHER PUBLICATIONS

Jun Yang et al: "Design and Performance of Multi-Band OFDM UWB System with Multiple Antennas", IEEE International Symposium on Personal, Indoor and Mobile Radio Communications. PIMRC, IEEE; PI, XX, Sep. 1, 2007, pp. 1-5, XP031168783.

* cited by examiner

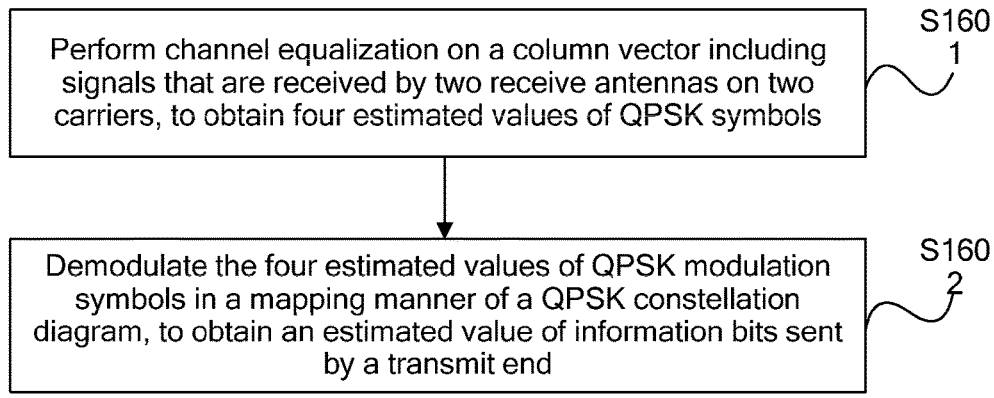

DATA TRANSMISSION METHOD AND APPARATUS

CROSS-REFERENCE TO RELATED APPLICATIONS

This application is a continuation of International Application No. PCT/CN2016/104305, filed on Nov. 2, 2016, which claims priority to Chinese Patent Application No. 201510780892.6, filed on Nov. 13, 2015. The disclosures of the aforementioned applications are hereby incorporated by reference in their entireties.

TECHNICAL FIELD

Embodiments of the present invention relate to the communications technologies, and in particular, to a data transmission method and apparatus.

BACKGROUND

Dual carrier modulation (DCM) is a technology that improves transceiving performance by using frequency diversity.

Frequency diversity means that a transmit end simultaneously transmits a signal by using two transmit frequencies with a relatively large interval, and a receive end simultaneously receives two radio-frequency signals and then combines them. Due to different operating frequencies, correlation between electromagnetic waves is extremely slim, and fading probabilities of all electromagnetic waves are different. Therefore, specially, the frequency diversity effectively resists frequency selective fading, and can improve the transceiving performance. For example, it is assumed that signals to be sent are $s_1$ and $s_2$, signals $x_1$ and $x_2$ are generated after $s_1$ and $s_2$ are combined, and $x_1 = \alpha_1 s_1 + \beta_1 s_2$ and $x_2 = \alpha_2 s_1 + \beta_2 s_2$. $x_1$ and $x_2$ are simultaneously sent on different frequencies (carriers), and the receive end simultaneously receives the two radio-frequency signals and then combines them, so as to implement the frequency diversity, thereby improving the transceiving performance.

However, with rapid development of wireless communications technologies, people's requirement for improving the transceiving performance is further increased, and transceiving performance of a data transmission method in the prior art cannot meet people's requirement.

SUMMARY

Embodiments of the present invention provide a data transmission method and apparatus, so as to improve transceiving performance of data transmission.

According to a first aspect, an embodiment of the present invention provides a data transmission method, including:

modulating information bits to be sent according to a lower order constellation diagram, and generating 4 m lower order modulation symbols, where m is an integer greater than or equal to 1;

separately multiplying a precoding matrix Q by a column vector including every four lower order modulation symbols in the 4 m lower order modulation symbols, to obtain 4 m higher order modulation symbols corresponding to a higher order constellation diagram; and sending the 4 m higher order modulation symbols on different carriers of two antennas respectively.

In one embodiment, the 4 m higher order modulation symbols are classified into four types. A $4(i-1)+1_{th}$ higher order modulation symbol is a first higher order modulation symbol; a $4(i-1)+2_{th}$ higher order modulation symbol is a second higher order modulation symbol; a $4(i-1)+3_{th}$ higher order modulation symbol is a third higher order modulation symbol; and a $4(i-1)+4_{th}$ higher order modulation symbol is a fourth higher order modulation symbol, where $1 \leq i \leq l$, and i is an integer.

The sending the 4 m to-be-sent higher order modulation symbols on different carriers of two antennas includes:

sending the first higher order modulation symbol on a first subcarrier of a first transmit antenna; sending the second higher order modulation symbol on a first subcarrier of a second transmit antenna; sending the third higher order modulation symbol on a second subcarrier of the first transmit antenna; and sending the fourth higher order modulation symbol on a second subcarrier of the second transmit antenna.

In one embodiment, the separately multiplying a precoding matrix Q by a column vector including every four lower order modulation symbols in the 4 m lower order modulation symbols, to obtain 4 m to-be-sent higher order modulation symbols corresponding to a higher order constellation diagram includes:

multiplying a precoding matrix $$Q = \frac{1}{\sqrt{85}} \begin{bmatrix} 8 & 4 & -2 & 1 \\ 4 & -8 & 1 & 2 \\ 2 & 1 & 8 & -4 \\ 1 & -2 & -4 & -8 \end{bmatrix}$$

by a column vector $[s_0 \ s_1 \ s_2 \ s_3]^T$ including four quadrature phase shift keying QPSK symbols, to obtain four 256QAM modulation symbols that are corresponding to a 256 quadrature amplitude modulation QAM constellation diagram and $[x_0 \ x_1 \ x_2 \ x_3]^T$ respectively, where $x_0$ is the first higher order modulation symbol, $x_1$ is the second higher order modulation symbol, $x_2$ is the third higher order modulation symbol, $x_3$ is the fourth higher order modulation symbol, and $[\ ]^T$ represents transpose.

In one embodiment, the separately multiplying a precoding matrix Q by a column vector including every four lower order modulation symbols in the 4 m lower order modulation symbols, to obtain 4 m to-be-sent higher order modulation symbols corresponding to a higher order constellation diagram includes:

multiplying a precoding matrix $$Q = \frac{1}{2} \begin{bmatrix} 1 & 1 & 1 & e^{j0.25\pi} \\ 1 & 1 & -1 & -e^{j0.25\pi} \\ 1 & -1 & -1 & e^{j0.25\pi} \\ 1 & -1 & 1 & -e^{j0.25\pi} \end{bmatrix}$$

by a column vector $[s_0 \ s_1 \ s_2 \ s_3]^T$ including four QPSK symbols, to obtain four 128QAM modulation symbols that are corresponding to a 128QAM constellation diagram and $[x_0 \ x_1 \ x_2 \ x_3]^T$ respectively, where $x_0$ is the first higher order modulation symbol, $x_1$ is the second higher order modulation symbol, $x_2$ is the third higher order modulation symbol, $x_3$ is the fourth higher order modulation symbol, and $[\ ]^T$ represents transpose.

In one embodiment, the separately multiplying a precoding matrix Q by a column vector including every four lower order modulation symbols in the 4 m lower order modulation symbols, to obtain 4 m to-be-sent higher order modulation symbols corresponding to a higher order constellation diagram includes:

multiplying a precoding matrix $$Q = \frac{1}{\sqrt{2}} \begin{bmatrix} 1 & j & 0 & 0 \\ 0 & 0 & 1 & -j \\ 1 & -j & 0 & 0 \\ j & 1 & 0 & 0 \end{bmatrix}$$

by a column vector $[s_0 \ s_1 \ s_2 \ s_3]^T$ including four BPSK symbols, to obtain four to-be-sent modulation symbols that are corresponding to a QPSK constellation diagram and $[x_0 \ x_1 \ x_2 \ x_3]^T$ respectively, where $x_0$ is the first higher order modulation symbol, $x_1$ is the second higher order modulation symbol, $x_2$ is the third higher order modulation symbol, and $x_3$ is the fourth higher order modulation symbol.

According to a second aspect, an embodiment of the present invention provides a data transmission method, including:

receiving, by two receive antennas, signals on two carriers, where the two receive antennas are respectively a first receive antenna and a second receive antenna, the two carriers are respectively a first subcarrier and a second subcarrier, a signal received by the first receive antenna on the first subcarrier is $r_{11}$, a signal received by the second receive antenna on the first subcarrier is $r_{21}$, a signal received by the first receive antenna on the second subcarrier is $r_{12}$, and a signal received by the second receive antenna on the second subcarrier is $r_{22}$;

obtaining 4 m estimated values of lower order modulation symbols after channel equalization is performed on $[r_{11} \ r_{21} \ r_{12} \ r_{22}]^T$, where m is an integer greater than or equal to 1; and demodulating the 4 m estimated values of lower order modulation symbols according to a corresponding lower order constellation diagram, to obtain an estimated value of information bits sent by a transmit end.

In one embodiment, the lower order modulation symbol is a quadrature phase shift keying QPSK modulation symbol or a binary phase shift keying BPSK modulation symbol.

According to a third aspect, an embodiment of the present invention provides a data transmission method, including:

performing channel equalization on signals that are received by two antennas on a first subcarrier, to obtain 2 m estimated values of first higher order modulation symbols, where m is an integer greater than or equal to 1;

performing channel equalization on signals that are received by the two antennas on a second subcarrier, to obtain 2 m estimated values of second higher order modulation symbols;

demodulating the 2 m estimated values of first higher order modulation symbols in a mapping manner of a higher order constellation diagram, to obtain a first estimated value of information bits sent by a transmit end;

demodulating the 2 m estimated values of second higher order modulation symbols in the mapping manner of the higher order constellation diagram, to obtain a second estimated value of the information bits sent by the transmit end; and combining the first estimated value of the information bits sent by the transmit end and the second estimated value of the information bits sent by the transmit end, to obtain an estimated value of the information bits sent by the transmit end.

In one embodiment, the higher order modulation symbol is a 256 quadrature amplitude modulation QAM modulation symbol or a quadrature phase shift keying QPSK modulation symbol.

According to a fourth aspect, an embodiment of the present invention provides a data transmission apparatus, including:

a modulation module, configured to modulate to-be-sent information bits according to a lower order constellation diagram, and generate 4 m lower order modulation symbols, where m is an integer greater than or equal to 1;

a processing module, configured to separately multiply a precoding matrix Q by a column vector including every four lower order modulation symbols in the 4 m lower order modulation symbols, to obtain 4 m higher order modulation symbols corresponding to a higher order constellation diagram; and a sending module, configured to respectively and correspondingly send the 4 m higher order modulation symbols on different carriers of two antennas.

In one embodiment, the 4 m higher order modulation symbols are classified into four types, a $4(i-1)+1_{th}$ higher order modulation symbol is a first higher order modulation symbol, a $4(i-1)+2_{th}$ higher order modulation symbol is a second higher order modulation symbol, a $4(i-1)+3_{th}$ higher order modulation symbol is a third higher order modulation symbol, and a $4(i-1)+4_{th}$ higher order modulation symbol is a fourth higher order modulation symbol, where $1 \leq i \leq l$, and i is an integer; and the sending module is configured to: send the first higher order modulation symbol on a first subcarrier of a first transmit antenna; send the second higher order modulation symbol on a first subcarrier of a second transmit antenna; send the third higher order modulation symbol on a second subcarrier of the first transmit antenna; and send the fourth higher order modulation symbol on a second subcarrier of the second transmit antenna.

In one embodiment, the processing module is configured to:

multiply a precoding matrix $$Q = \frac{1}{\sqrt{85}} \begin{bmatrix} 8 & 4 & -2 & 1 \\ 4 & -8 & 1 & 2 \\ 2 & 1 & 8 & -4 \\ 1 & -2 & -4 & -8 \end{bmatrix}$$

by a column vector $[s_0 \ s_1 \ s_2 \ s_3]^T$ including four quadrature phase shift keying QPSK symbols, to obtain four 256QAM modulation symbols that are corresponding to a 256 quadrature amplitude modulation QAM constellation diagram and that are respectively $[x_0 \ x_1 \ x_2 \ x_3]^T$, where $x_0$ is the first higher order modulation symbol, $x_1$ is the second higher order modulation symbol, $x_2$ is the third higher order modulation symbol, $x_3$ is the fourth higher order modulation symbol, and $[\ ]^T$ represents transpose.

In one embodiment, the processing module is configured to:

multiply a precoding matrix $$Q = \frac{1}{2} \begin{bmatrix} 1 & 1 & 1 & e^{j0.25\pi} \\ 1 & 1 & -1 & -e^{j0.25\pi} \\ 1 & -1 & -1 & e^{j0.25\pi} \\ 1 & -1 & 1 & -e^{j0.25\pi} \end{bmatrix}$$

by a column vector $[s_0\ s_1\ s_2\ s_3]^T$ including four QPSK symbols, to obtain four 128QAM modulation symbols that are corresponding to a 128QAM constellation diagram and that are respectively $[x_0\ x_1\ x_2\ x_3]^T$, where $x_0$ is the first higher order modulation symbol, $x_1$ is the second higher order modulation symbol, $x_2$ is the third higher order modulation symbol, $x_3$ is the fourth higher order modulation symbol, and $[\ ]^T$ represents transpose.

In one embodiment, the processing module is configured to:

multiply a precoding matrix $$Q = \frac{1}{\sqrt{2}}\begin{bmatrix} 1 & j & 0 & 0 \\ 0 & 0 & 1 & -j \\ 1 & -j & 0 & 0 \\ j & 1 & 0 & 0 \end{bmatrix}$$

by a column vector $[s_0\ s_1\ s_2\ s_3]^T$ including four BPSK symbols, to obtain four modulation symbols that are corresponding to a QPSK constellation diagram and that are respectively $[x_0\ x_1\ x_2\ x_3]^T$, where $x_0$ is the first higher order modulation symbol, $x_1$ is the second higher order modulation symbol, $x_2$ is the third higher order modulation symbol, and $x_3$ is the fourth higher order modulation symbol.

According to a fifth aspect, an embodiment of the present invention provides a data transmission apparatus, including:

a receiving module, configured to receive signals on two carriers, where the receiving module is deployed on a first receive antenna and a second receive antenna, the two carriers are respectively a first subcarrier and a second subcarrier, and a signal received by the first receive antenna on the first subcarrier is $r_{11}$, a signal received by the second receive antenna on the first subcarrier is $r_{21}$, a signal received by the first receive antenna on the second subcarrier is $r_{12}$, and a signal received by the second receive antenna on the second subcarrier is $r_{22}$;

a channel equalization module, configured to obtain 4 m estimated values of lower order modulation symbols after channel equalization is performed on $[r_{11}\ r_{21}\ r_{12}\ r_{22}]^T$, where m is an integer greater than or equal to 1; and a demodulation module, configured to demodulate the 4 m estimated values of lower order modulation symbols according to a corresponding lower order constellation diagram, to obtain an estimated value of information bits sent by a transmit end.

In one embodiment, the lower order modulation symbol is a quadrature phase shift keying QPSK modulation symbol or a binary phase shift keying BPSK modulation symbol.

According to a sixth aspect, an embodiment of the present invention provides a data transmission apparatus, including:

a channel equalization module, configured to perform channel equalization on signals that are received by two antennas on a first subcarrier, to obtain 2 m estimated values of first higher order modulation symbols, where m is an integer greater than or equal to 1, where the channel equalization module is further configured to perform channel equalization on signals that are received by the two antennas on a second subcarrier, to obtain 2 m estimated values of second higher order modulation symbols;

a demodulation module, configured to demodulate the 2 m estimated values of first higher order modulation symbols in a mapping manner of a higher order constellation diagram, to obtain a first estimated value of information bits sent by a transmit end, where the demodulation module is further configured to demodulate the 2 m estimated values of second higher order modulation symbols in the mapping manner of the higher order constellation diagram, to obtain a second estimated value of the information bits sent by the transmit end; and a processing module, configured to combine the first estimated value of the information bits sent by the transmit end and the second estimated value of the information bits sent by the transmit end, to obtain an estimated value of the information bits sent by the transmit end.

In one embodiment, the higher order modulation symbol is a 256 quadrature amplitude modulation QAM modulation symbol or a quadrature phase shift keying QPSK modulation symbol.

Embodiments of the present invention provide a data transmission method and apparatus, the information bits are modulated according to the lower order constellation diagram, and 4 m lower order modulation symbols are generated; the precoding matrix Q is multiplied by the column vector including every four lower order modulation symbols in the 4 m lower order modulation symbols, to obtain the 4 m higher order modulation symbols corresponding to the higher order constellation diagram; and the 4 m higher order modulation symbols are respectively and correspondingly sent on different carriers of the two antennas. The higher order modulation symbols include some or all information bits. Therefore, the same signal can be simultaneously sent on different carriers of multiple antennas, and frequency diversity and space diversity are implemented, so that transceiving performance of data transmission is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 16 is a schematic flowchart of Embodiment 11 of a data transmission method according to one embodiment of the present invention;

FIG. 17 is a schematic structural diagram of Embodiment 1 of a data transmission apparatus according to one embodiment of the present invention;

FIG. 18 is a schematic structural diagram of Embodiment 2 of a data transmission apparatus according to one embodiment of the present invention;

FIG. 19 is a schematic structural diagram of Embodiment 3 of a data transmission apparatus according to one embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments of the present invention described herein can be implemented in orders except the order illustrated or described herein. Moreover, the terms "include", "contain" and any other variants are intended to cover the non-exclusive inclusion, for example, a process, method, system, product, or device that includes a list of steps or units is not necessarily limited to those units, but may include other units not expressly listed or inherent to such a process, method, system, product, or device.

In the present invention, to improve transceiving performance of data transmission, both frequency diversity and space diversity are implemented by sending a signal.

Figure 1:
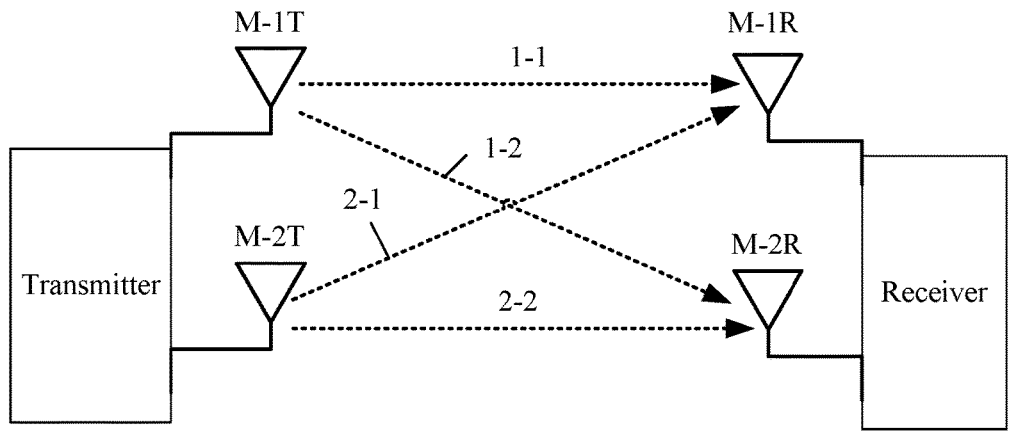
FIG. 1 is a schematic diagram of an application scenario according to one embodiment of the present invention.

An application scenario of the present invention is shown in FIG. 1. FIG. 1 is a schematic diagram of an application scenario according to one embodiment of the present invention, and FIG. 1 shows a schematic structural diagram of a 2×2 MIMO system. The system includes a transmitter and a receiver. The transmitter in the schematic structural diagram shown in FIG. 1 includes two transmit antennas, which are respectively a first transmit antenna M-1T and a second transmit antenna M-2T. The receiver includes two receive antennas, which are respectively a first receive antenna M-1R and a second receive antenna M-2R. There are four channels in total between the two transmit antennas and the two receive antennas, which are respectively 1-1 (a channel from the first transmit antenna to the first receive antenna), 1-2 (a channel from the first transmit antenna to the second receive antenna), 2-1 (a channel from the second transmit antenna to the first receive antenna), and 2-2 (a channel from the second transmit antenna to the second receive antenna).

Specific embodiments are used below to describe in detail the technical solutions of the present invention. The following several specific embodiments may be combined with each other, and the same or similar concept or process may not be described repeatedly in some embodiments.

Figure 2:
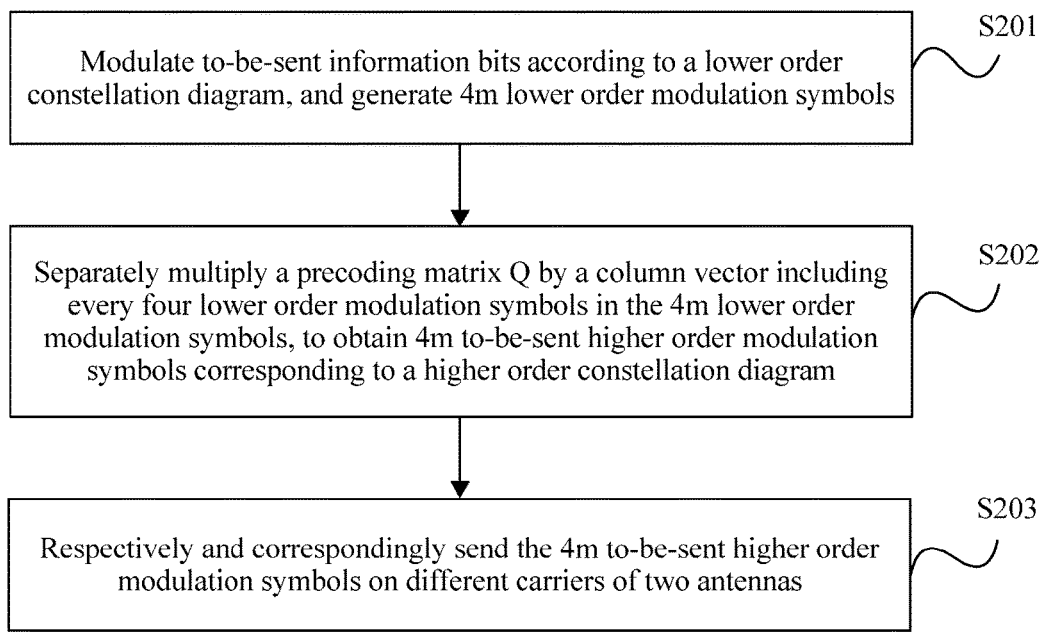
FIG. 2 is a schematic flowchart of Embodiment 1 of a data transmission method according to one embodiment of the present invention.

FIG. 2 is a flowchart of a data transmission method according to one embodiment of the present invention. The method in this embodiment is executed by a transmitter, as shown in FIG. 2.

S201. Modulate information bits according to a lower order constellation diagram, and generate 4 m lower order modulation symbols, where m is an integer greater than or equal to 1.

S202. Separately multiply a precoding matrix Q by a column vector including every four lower order modulation symbols in the 4 m lower order modulation symbols, to obtain 4 m higher order modulation symbols corresponding to a higher order constellation diagram.

The precoding matrix Q is obtained according to the 4 m lower order modulation symbols and the higher order constellation diagram.

The higher order modulation symbols include some or all to-be-sent information bits.

For example:

For a quadrature phase shift keying (Quadrature Phase Shift Key, QPSK), the higher order modulation symbols include all the information bits. In a sending process, an information bit is sent on all transmit antennas and all subcarriers, for example, all symbols that are sent on a first subcarrier of a first transmit antenna, a second subcarrier of the first transmit antenna, a first subcarrier of a second transmit antenna, and a second subcarrier of the second transmit antenna include information about an information bit 1.

For an SQPSK, the higher order modulation symbols include half of the to-be-sent information bits. In a sending process, one information bit is sent on one subcarrier of all transmit antennas. If four information bits are sent, both a first subcarrier of a first transmit antenna and a second subcarrier of a second transmit antenna include information about an information bit 1 and an information bit 2, and both a second subcarrier of the first transmit antenna and a first subcarrier of the second transmit antenna include information about an information bit 3 and an information bit 4.

S203: Respectively send the 4 m higher order modulation symbols on different carriers of two antennas.

The 4 m higher order modulation symbols are classified into four types, a $4(i-1)+1_{th}$ higher order modulation symbol is a first higher order modulation symbol, a $4(i-1)+2_{th}$ higher order modulation symbol is a second higher order modulation symbol, a $4(i-1)+3_{th}$ higher order modulation symbol is a third higher order modulation symbol, and a $4(i-1)+4_{th}$ higher order modulation symbol is a fourth higher order modulation symbol, where $1 \leq i \leq l$, and i is an integer.

Specifically, the first higher order modulation symbol is sent on a first subcarrier of a first transmit antenna; the second higher order modulation symbol is sent on a first subcarrier of a second transmit antenna; the third higher order modulation symbol is sent on a second subcarrier of the first transmit antenna; and the fourth higher order modulation symbol is sent on a second subcarrier of the second transmit antenna.

In this embodiment of the present invention, the information bits are modulated according to the lower order constellation diagram, and the 4 m lower order modulation symbols are generated; the precoding matrix Q is multiplied by the column vector including every four lower order modulation symbols in the 4 m lower order modulation symbols, to obtain the 4 m higher order modulation symbols corresponding to the higher order constellation diagram; and the 4 m higher order modulation symbols are respectively and correspondingly sent on the different carriers of the two antennas. The higher order modulation symbols include some or all information bits. Therefore, the same signal can be simultaneously sent on different carriers of multiple antennas, and frequency diversity and space diversity are implemented, so that transceiving performance of data transmission is improved.

Figure 3:
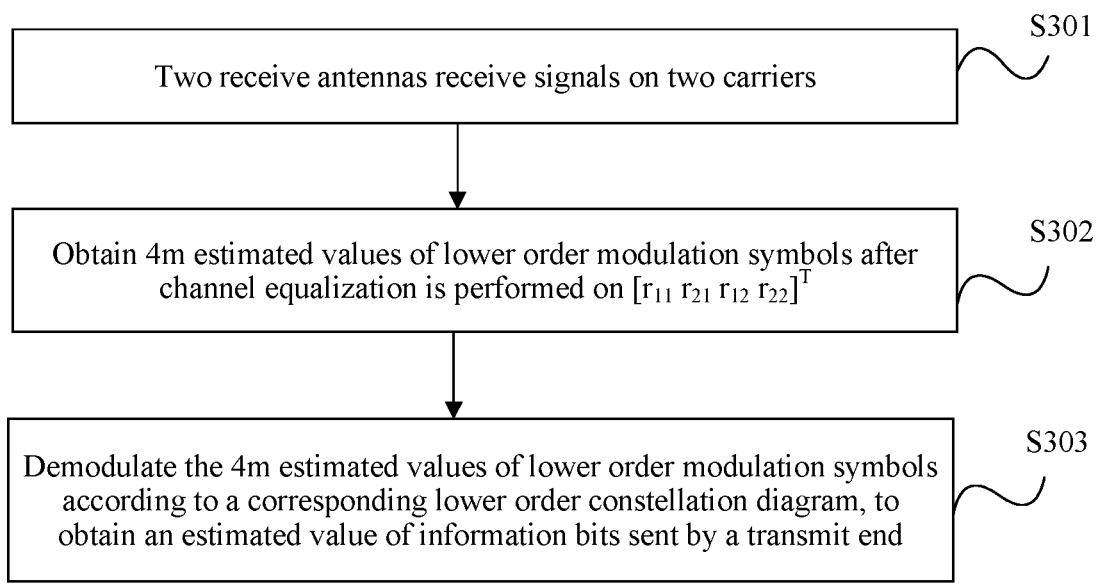
FIG. 3 is a schematic flowchart of Embodiment 2 of a data transmission method according to one embodiment of the present invention.
Figure 4:
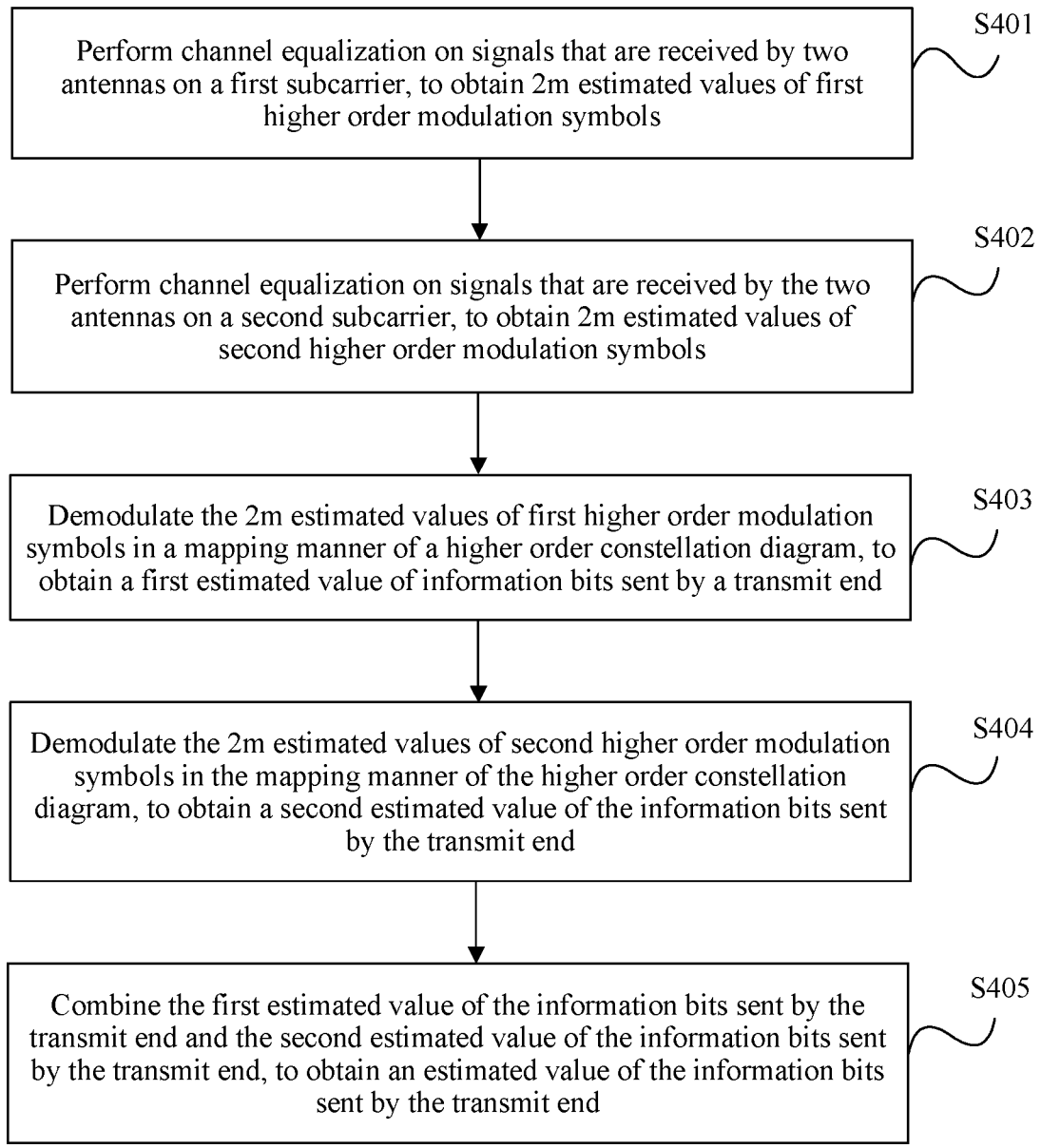
FIG. 4 is a schematic flowchart of Embodiment 3 of a data transmission method according to one embodiment of the present invention.

FIG. 3 and FIG. 4 show two methods executed by a receiver. A method in FIG. 3 is corresponding to a manner of joint demodulation, and a method in FIG. 4 is corresponding to a manner of performing independent demodulation and then performing combination. For details, refer to detailed descriptions of FIG. 3 and FIG. 4.

FIG. 3 is a flowchart of a data transmission method according to one embodiment of the present invention. The method in this embodiment is executed by the receiver, as shown in FIG. 3.

S301. Two receive antennas receive signals on two carriers.

The two receive antennas are respectively a first receive antenna and a second receive antenna, and the two carriers are respectively a first subcarrier and a second subcarrier. A signal received by the first receive antenna on the first subcarrier is $r_{11}$, a signal received by the second receive antenna on the first subcarrier is $r_{21}$, a signal received by the first receive antenna on the second subcarrier is $r_{12}$, and a signal received by the second receive antenna on the second subcarrier is $r_{22}$.

S302. Obtain 4 m estimated values of lower order modulation symbols after channel equalization is performed on $[r_{11}\ r_{21}\ r_{12}\ r_{22}]^T$, where m is an integer greater than or equal to 1.

S303. Demodulate the 4 m estimated values of lower order modulation symbols according to a corresponding lower order constellation diagram, to obtain an estimated value of information bits sent by a transmit end.

In this embodiment, the channel equalization is performed on a column vector including the signals that are received by the two receive antennas on different carriers, to obtain the 4 m estimated values of lower order modulation symbols; the 4 m estimated values of lower order modulation symbols are demodulated according to the corresponding lower order constellation diagram, to obtain the estimated value of the information bits sent by the transmit end; and the estimated value of the information bits sent by the transmit end is obtained in the manner of joint demodulation. The same signal can be simultaneously received by multiple receive antennas on different carriers, and frequency diversity and space diversity are implemented, so that transceiving performance of data transmission is improved.

FIG. 4 is a flowchart of a data transmission method according to one embodiment of the present invention. The method in this embodiment is executed by the receiver, as shown in FIG. 4.

S401. Perform channel equalization on signals that are received by two antennas on a first subcarrier, to obtain 2 m estimated values of first higher order modulation symbols, where m is an integer greater than or equal to 1.

S402. Perform channel equalization on signals that are received by the two antennas on a second subcarrier, to obtain 2 m estimated values of second higher order modulation symbols.

S403. Demodulate the 2 m estimated values of first higher order modulation symbols in a mapping manner of a higher order constellation diagram, to obtain a first estimated value of information bits sent by a transmit end.

S404. Demodulate the 2 m estimated values of second higher order modulation symbols in the mapping manner of the higher order constellation diagram, to obtain a second estimated value of the information bits sent by the transmit end.

S405. Combine the first estimated value of the information bits sent by the transmit end and the second estimated value of the information bits sent by the transmit end, to obtain an estimated value of the information bits sent by the transmit end.

In this embodiment, the channel equalization is performed on the signals that are received by the two antennas on the first subcarrier, to obtain the 2 m estimated values of first higher order modulation symbols; the channel equalization is performed on the signals that are received by the two antennas on the second subcarrier, to obtain the 2 m estimated values of second higher order modulation symbols; the 2 m estimated values of first higher order modulation symbols are demodulated in the mapping manner of the higher order constellation diagram, to obtain the first estimated value of the information bits sent by the transmit end; the 2 m estimated values of second higher order modulation symbols are demodulated in the mapping manner of the higher order constellation diagram, to obtain the second estimated value of the information bits sent by the transmit end; and the first estimated value of the information bits sent by the transmit end and the second estimated value of the information bits sent by the transmit end are combined, to obtain the estimated value of the information bits sent by the transmit end, that is, the estimated value of the information bits sent by the transmit end is obtained in the manner of performing independent demodulation and then performing combination. The same signal can be simultaneously received by multiple receive antennas on different carriers, and frequency diversity and space diversity are implemented, so that transceiving performance of data transmission is improved.

The SQPSK and the QPSK are used as examples for detailed description in the following, and in the following embodiments, m=1 is used as an example for description.

Figure 5:
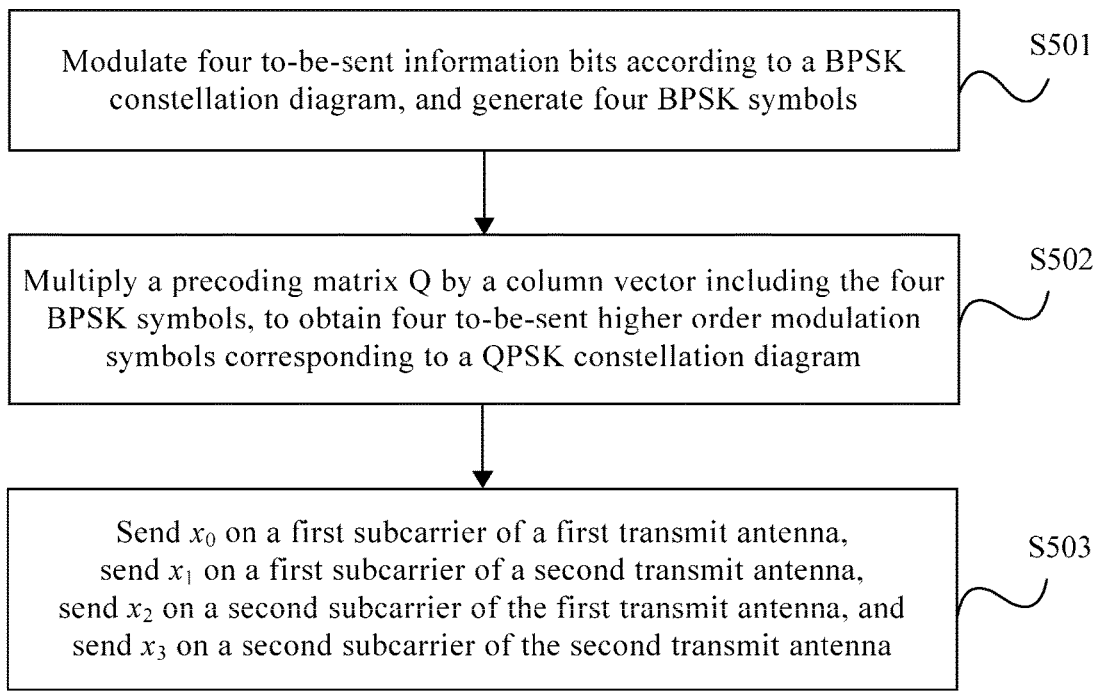
FIG. 5 is a schematic flowchart of Embodiment 4 of a data transmission method according to one embodiment of the present invention.

1. A flowchart using the SQPSK as an example. A flowchart of a transmit end is shown in FIG. 5.

S501. Modulate four information bits according to a BPSK constellation diagram, and generate four BPSK symbols.

Figure 6:
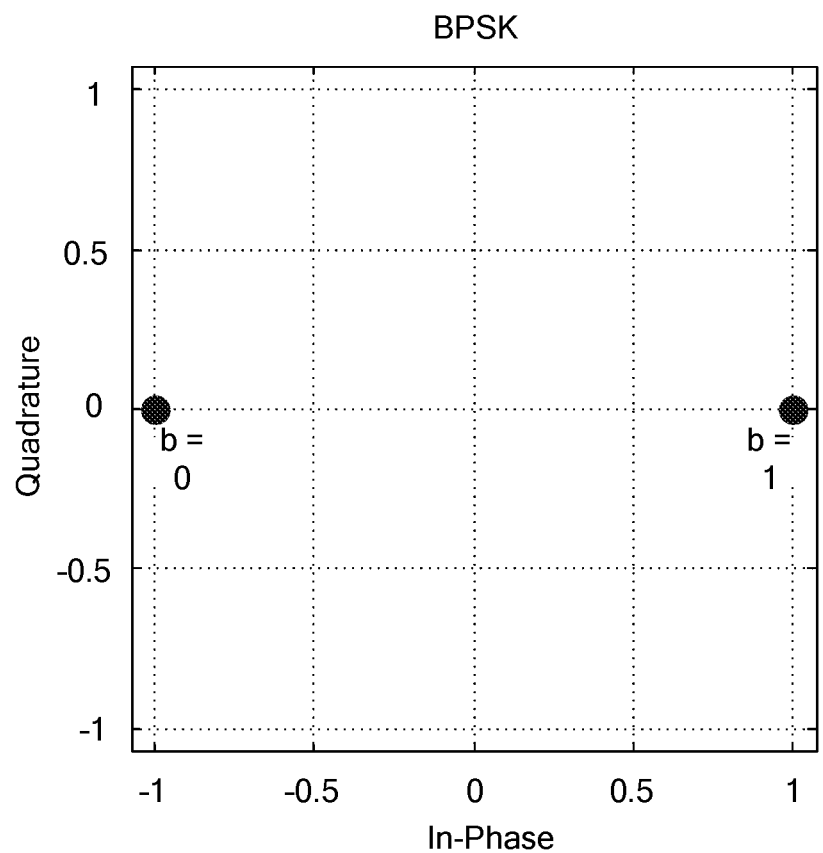
FIG. 6 is a BPSK constellation diagram according to one embodiment of the present invention.

A binary phase shift keying (Binary Phase Shift Keying, BPSK for short) constellation diagram is shown in FIG. 6, the four information bits are respectively $b_0$, $b_1$, $b_2$, and $b_3$, and the four BPSK symbols are respectively $s_0$, $s_1$, $s_2$, and $s_3$ where $s_k=2*b_k-1$ and $k=0, 1, 2$, or 3.

S502. Multiply a precoding matrix Q by a column vector including the four BPSK symbols, to obtain four higher order modulation symbols corresponding to a QPSK constellation diagram.

The QPSK constellation diagram is shown in FIG. 6.

A precoding matrix $$Q = \frac{1}{\sqrt{2}} \begin{bmatrix} 1 & j & 0 & 0 \\ 0 & 0 & 1 & -j \\ 1 & -j & 0 & 0 \\ j & 1 & 0 & 0 \end{bmatrix}$$

is obtained according to four lower order modulation symbols and the QPSK constellation diagram, $[s_0\ s_1\ s_2\ s_3]^T$ is the column vector including the four BPSK symbols, the four higher order modulation symbols are respectively $[x_0\ x_1\ x_2\ x_3]^T$, and $$\begin{bmatrix} x_0 \\ x_1 \\ x_2 \\ x_3 \end{bmatrix} = \frac{1}{\sqrt{2}} \begin{bmatrix} 1 & j & 0 & 0 \\ 0 & 0 & 1 & -j \\ 1 & -j & 0 & 0 \\ j & 1 & 0 & 0 \end{bmatrix} \begin{bmatrix} s_0 \\ s_1 \\ s_2 \\ s_3 \end{bmatrix}.$$

S503. Send $x_0$ on a first subcarrier of a first transmit antenna; send $x_1$ on a first subcarrier of a second transmit antenna; send $x_2$ on a second subcarrier of the first transmit antenna; and send $x_3$ on a second subcarrier of the second transmit antenna.

In this embodiment, the four information bits are modulated according to the BPSK constellation diagram, and four BPSK symbols are generated; the precoding matrix Q is multiplied by the column vector including the four BPSK symbols, to obtain the four higher order modulation symbols corresponding to the QPSK constellation diagram; and $x_0$ is sent on the first subcarrier of the first transmit antenna, $x_1$ is sent on the first subcarrier of the second transmit antenna, $x_2$ is sent on the second subcarrier of the first transmit antenna, and $x_3$ is sent on the second subcarrier of the second transmit antenna. It can be learned that $s_0$ is simultaneously sent on the first subcarrier and the second subcarrier, and sent on the first transmit antenna and the second transmit antenna, and both frequency diversity and space diversity are implemented; and $s_1$ is simultaneously sent on the first subcarrier and the second subcarrier, and sent on the first transmit antenna and the second transmit antenna, and both the frequency diversity and the space diversity are implemented, so that transceiving performance of data transmission is improved.

Figure 8:
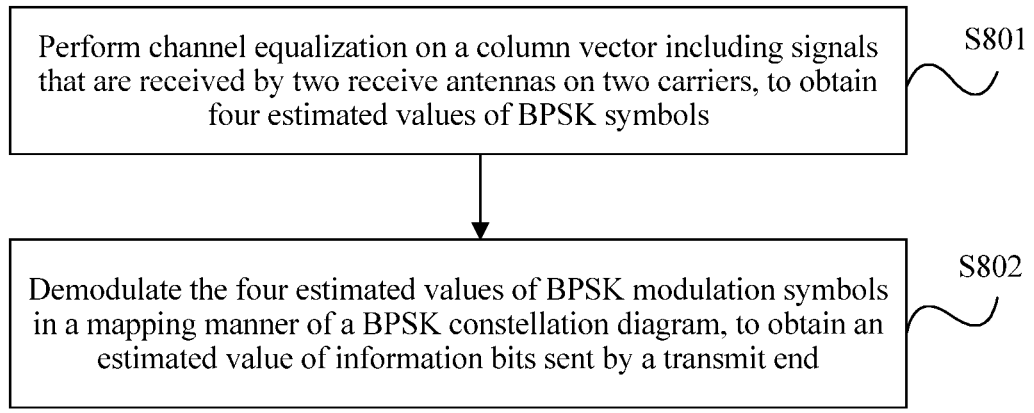
FIG. 8 is a schematic flowchart of Embodiment 5 of a data transmission method according to one embodiment of the present invention.
Figure 9:
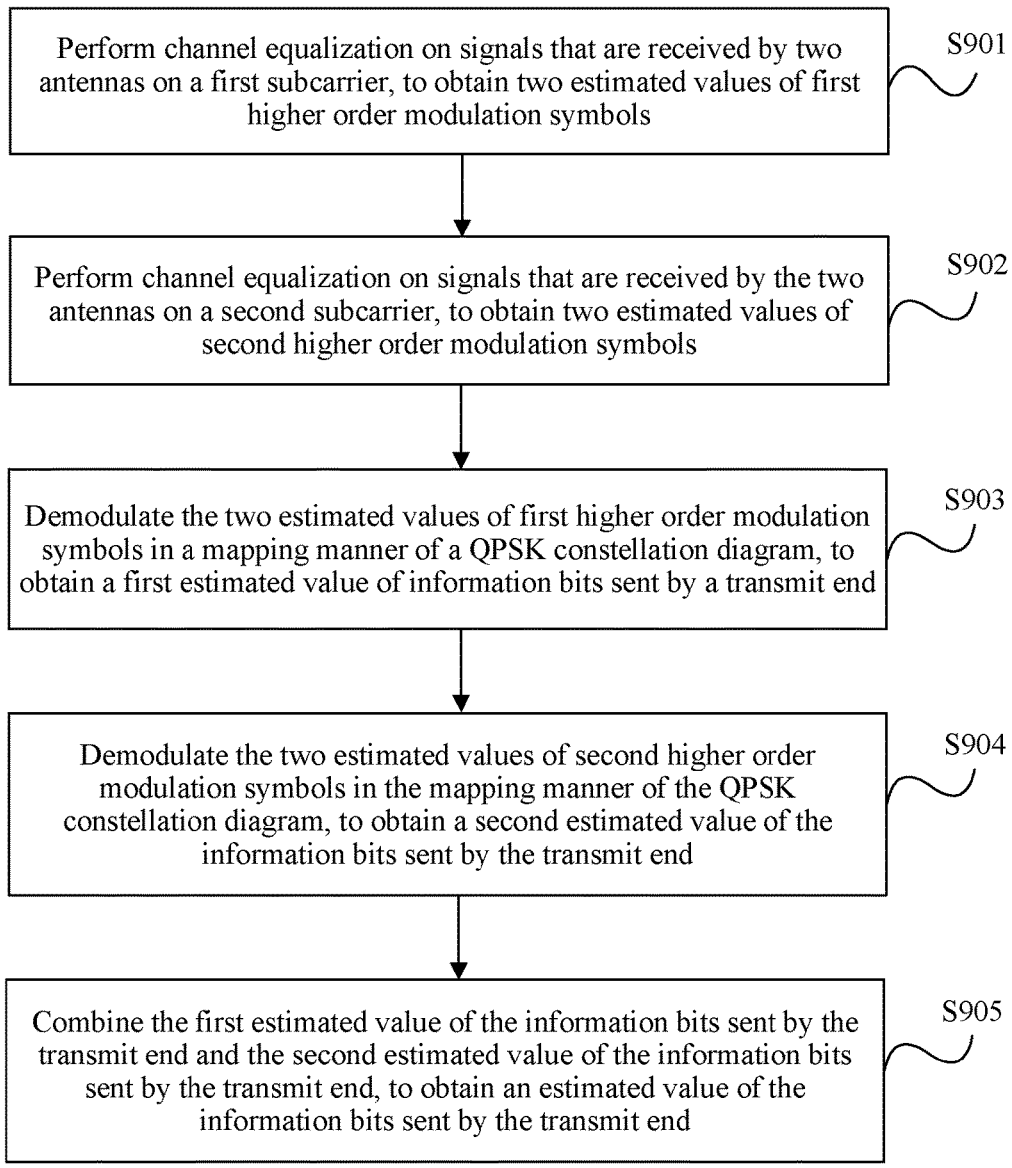
FIG. 9 is a schematic flowchart of Embodiment 6 of a data transmission method according to one embodiment of the present invention.

There are two processing manners at a receive end. A first manner is shown in FIG. 8, and a second manner is shown in FIG. 9. The first manner is described first.

S801. Perform channel equalization on a column vector including signals that are received by two receive antennas on two carriers, to obtain four estimated values of BPSK symbols.

The column vector including signals that are received by the two receive antennas on the two carriers is $$\begin{bmatrix} r_{1,1} \\ r_{2,1} \\ r_{1,2} \\ r_{2,2} \end{bmatrix}, \text{ and}$$

$$\begin{bmatrix} r_{1,1} \\ r_{2,1} \\ r_{1,2} \\ r_{2,2} \end{bmatrix} = \begin{bmatrix} h_{11,1} & h_{12,1} & 0 & 0 \\ h_{21,1} & h_{22,1} & 0 & 0 \\ 0 & 0 & h_{11,1} & h_{12,1} \\ 0 & 0 & h_{21,1} & h_{22,1} \end{bmatrix} \frac{1}{\sqrt{2}} \begin{bmatrix} 1 & j & 0 & 0 \\ 0 & 0 & 1 & -j \\ 1 & -j & 0 & 0 \\ j & 1 & 0 & 0 \end{bmatrix} \begin{bmatrix} s_0 \\ s_1 \\ s_2 \\ s_3 \end{bmatrix},$$

where $r_{1,1}$ represents a signal received by a first receive antenna on a first subcarrier, $r_{2,1}$ represents a signal received by a second receive antenna on the first subcarrier, $r_{1,2}$ represents a signal received by the first receive antenna on a second subcarrier, and $r_{2,2}$ represents a signal received by the second receive antenna on the second subcarrier. $h_{11,1}$ represents a channel response that is from a first transmit antenna to the first receive antenna and that is on the first subcarrier; $h_{12,1}$ represents a channel response that is from the first transmit antenna to the second receive antenna and that is on the first subcarrier; $h_{21,1}$ represents a channel response that is from a second transmit antenna to the first receive antenna and that is on the first subcarrier; $h_{22,1}$ represents a channel response that is from the second transmit antenna to the second receive antenna and that is on the first subcarrier; $h_{11,2}$ represents a channel response that is from the first transmit antenna to the first receive antenna and that is on the second subcarrier; $h_{12,2}$ represents a channel response that is from the first transmit antenna to the second receive antenna and that is on the second subcarrier; $h_{21,2}$ represents a channel response that is from the second transmit antenna to the first receive antenna and that is on the second subcarrier; and $h_{22,2}$ represents a channel response that is from the second transmit antenna to the second receive antenna and that is on the second subcarrier.

The four estimated values of BPSK symbols are respectively represented as $\hat{s}_0$, $\hat{s}_1$, $\hat{s}_2$, and $\hat{s}_3$, and $$\begin{bmatrix} \hat{s}_0 \\ \hat{s}_1 \\ \hat{s}_2 \\ \hat{s}_3 \end{bmatrix} = W \begin{bmatrix} r_{1,1} \\ r_{2,1} \\ r_{1,2} \\ r_{2,2} \end{bmatrix}.$$

W is a channel equalization matrix. If a linear minimum mean square error method is used, a corresponding channel equalization matrix is $W=(G^H G+\delta^2 I_4)^{-1} G^H$; or if a zero forcing method is used, a corresponding channel equalization matrix is $W=G^{-1}$, where $$G = \begin{bmatrix} h_{11,1} & h_{12,1} & 0 & 0 \\ h_{21,1} & h_{22,1} & 0 & 0 \\ 0 & 0 & h_{11,2} & h_{12,2} \\ 0 & 0 & h_{21,2} & h_{22,2} \end{bmatrix} Q,$$

$\delta^2$ is noise power, $I_4$ is a fourth-order identity matrix, and $(\ )^{-1}$ represents matrix inversion.

S802. Demodulate the four estimated values of BPSK modulation symbols in a mapping manner of a BPSK constellation diagram, to obtain an estimated value of information bits sent by a transmit end.

In this embodiment, the channel equalization is performed on the column vector including the signals that are received by the two receive antennas on the two carriers, to obtain the four estimated values of BPSK symbols; and the four estimated values of BPSK modulation symbols are demodulated in the mapping manner of the BPSK constellation diagram, to obtain the estimated value of the information bits sent by the transmit end, that is, the estimated value of the information bits sent by the transmit end is obtained in the manner of joint demodulation. The same signal can be simultaneously received by multiple receive antennas on different carriers, and frequency diversity and space diversity are implemented, so that transceiving performance of data transmission is improved.

The second manner is shown in FIG. 9.

S901. Perform channel equalization on signals that are received by two antennas on a first subcarrier, to obtain two estimated values of first higher order modulation symbols.

The signals that are received by the two antennas on the first subcarrier may be represented as:

$$\begin{bmatrix} r_{1,1} \\ r_{2,1} \end{bmatrix} = \begin{bmatrix} h_{11,1} & h_{12,1} \\ h_{21,1} & h_{22,1} \end{bmatrix} \begin{bmatrix} x_0 \\ x_1 \end{bmatrix},$$

where $r_{1,1}$ represents a signal received by a first receive antenna on the first subcarrier, and $r_{2,1}$ represents a signal received by a second receive antenna on the first subcarrier.

The channel equalization is performed on the signals $$\begin{bmatrix} r_{1,1} \\ r_{2,1} \end{bmatrix}$$

that are received on the first subcarrier, to obtain the two estimated values that are of the first higher order modulation symbols and that are respectively $\hat{x}_1$ and $\hat{x}_2$ and $$\begin{bmatrix} \hat{x}_0 \\ \hat{x}_1 \end{bmatrix} = W \begin{bmatrix} r_{1,1} \\ r_{2,1} \end{bmatrix},$$

where W is a channel equalization matrix. If a linear minimum mean square error method is used, a corresponding channel equalization matrix is $W=(G^H G+\delta^2 I_4)^{-1} G^H$; or if a zero forcing method is used, a corresponding channel equalization matrix is $W=G^{-1}$, where $$G = \begin{bmatrix} h_{11,1} & h_{12,1} \\ h_{21,2} & h_{22,2} \end{bmatrix},$$

$\delta^2$ is noise power, $I_4$ is a fourth-order identity matrix, and $(\ )^{-1}$ represents matrix inversion.

S902. Perform channel equalization on signals that are received by the two antennas on a second subcarrier, to obtain two estimated values of second higher order modulation symbols.

The signals that are received by the two antennas on the second subcarrier may be represented as:

$$\begin{bmatrix} r_{1,2} \\ r_{2,2} \end{bmatrix} = \begin{bmatrix} h_{11,2} & h_{12,2} \\ h_{21,2} & h_{22,2} \end{bmatrix} \begin{bmatrix} x_2 \\ x_3 \end{bmatrix},$$

where $r_{1,2}$ represents a signal received by the first receive antenna on the second subcarrier, and $r_{2,2}$ represents a signal received by the second receive antenna on the second subcarrier.

The channel equalization is performed on the signals $$\begin{bmatrix} r_{1,2} \\ r_{2,2} \end{bmatrix}$$

that are received on the second subcarrier, to obtain the two estimated values that are of the second higher order modulation symbols and that are respectively $\hat{x}_2$ and $\hat{x}_3$, and $$\begin{bmatrix} \hat{x}_2 \\ \hat{x}_3 \end{bmatrix} = W \begin{bmatrix} r_{1,2} \\ r_{2,2} \end{bmatrix},$$

where W is a channel equalization matrix. If a linear minimum mean square error method is used, a corresponding channel equalization matrix is $W=(G^H G+\delta^2 I_4)^{-1} G^H$; or if a zero forcing method is used, a corresponding channel equalization matrix is $W=G^{-1}$, where $$G = \begin{bmatrix} h_{11,2} & h_{12,2} \\ h_{21,2} & h_{22,2} \end{bmatrix},$$

$\delta^2$ is noise power, $I_4$ is a fourth-order identity matrix, and $(\ )^{-1}$ represents matrix inversion.

S903. Demodulate the two estimated values of first higher order modulation symbols in a mapping manner of a QPSK constellation diagram, to obtain a first estimated value of information bits sent by a transmit end.

The first estimated value may be represented as: $\hat{b}_0$, $\hat{b}_1$, $\hat{b}_2$, and $\hat{b}_3$.

S904. Demodulate the two estimated values of second higher order modulation symbols in the mapping manner of the QPSK constellation diagram, to obtain a second estimated value of the information bits sent by the transmit end.

The second estimated value may be represented as: $\bar{b}_0$, $\bar{b}_1$, $\bar{b}_2$, and $\bar{b}_3$.

S905. Combine the first estimated value of the information bits sent by the transmit end and the second estimated value of the information bits sent by the transmit end, to obtain an estimated value of the information bits sent by the transmit end.

The estimated value of the information bits sent by the transmit end is $\tilde{b}_0$, $\tilde{b}_1$, $\tilde{b}_2$, or $\tilde{b}_3$, where $\tilde{b}_k=(\hat{b}_k+\bar{b}_k)/2$, and k=0, 1, 2, or 3.

In this embodiment, the channel equalization is performed on the signals that are received by the two antennas on the first subcarrier, to obtain the two estimated values of first higher order modulation symbols; the channel equalization is performed on the signals that are received by the two antennas on the second subcarrier, to obtain the two estimated values of second higher order modulation symbols; the two estimated values of first higher order modulation symbols are demodulated in the mapping manner of the QPSK constellation diagram, to obtain the first estimated value of the information bits sent by the transmit end; the two estimated values of second higher order modulation symbols are demodulated in the mapping manner of the QPSK constellation diagram, to obtain the second estimated value of the information bits sent by the transmit end; and the first estimated value of the information bits sent by the transmit end and the second estimated value of the information bits sent by the transmit end are combined, to obtain the estimated value of the information bits sent by the transmit end, that is, the estimated value of the information bits sent by the transmit end is obtained in the manner of performing independent demodulation and then performing combination. The same signal can be simultaneously received by multiple receive antennas on different carriers, and frequency diversity and space diversity are implemented, so that transceiving performance of data transmission is improved.

2. A flowchart using the QPSK as an example. Implementations of the QPSK are classified into two types, a higher order constellation diagram of a first implementation is a 256 quadrature amplitude modulation (Quadrature Amplitude Modulation, QAM for short) constellation diagram, and a higher order constellation diagram of a second implementation is a 128QAM constellation diagram.

Figure 10:
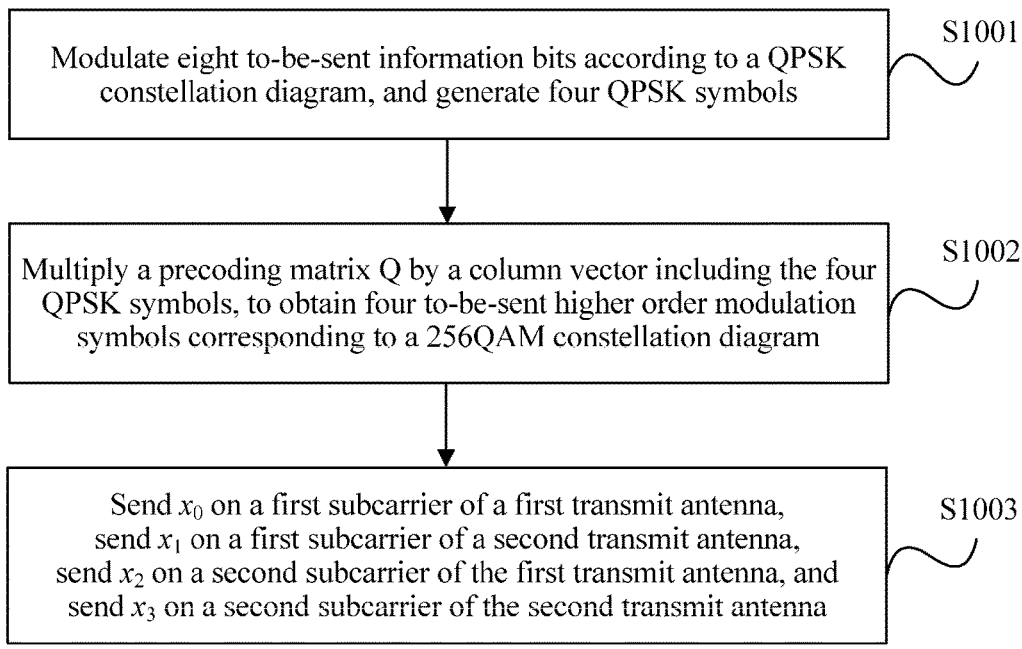
FIG. 10 is a schematic flowchart of Embodiment 7 of a data transmission method according to one embodiment of the present invention.

In one embodiment, a flowchart at a transmit end is shown in FIG. 10.

S1001. Modulate eight information bits according to a QPSK constellation diagram, and generate four QPSK symbols.

Figure 7:
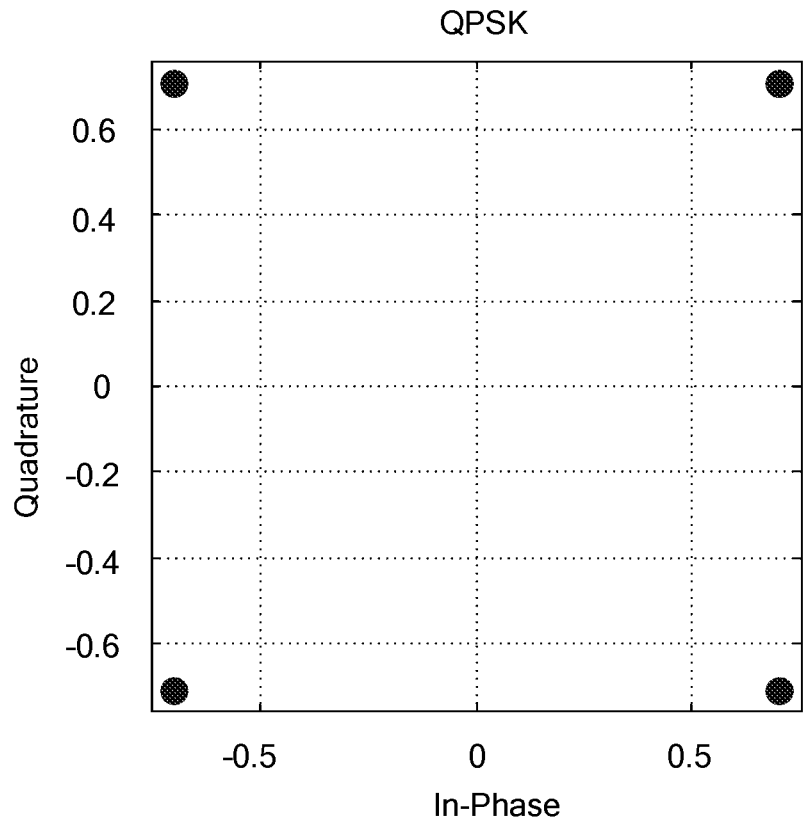
FIG. 7 is a QPSK constellation diagram according to one embodiment of the present invention.

The QPSK constellation diagram is shown in FIG. 7, the eight information bits are respectively $b_k$, where $k=0, 1, \ldots,$ or 7, and the four QPSK symbols are respectively $s_0, s_1, s_2,$ and $s_3$, where $s_k=(2*b_{2k}-1)+j(2*b_{2k+1}-1)$, and $k=0, 1, 2,$ or 3.

S1002. Multiply a precoding matrix Q by a column vector including the four QPSK symbols, to obtain four higher order modulation symbols corresponding to a 256QAM constellation diagram.

Figure 11:
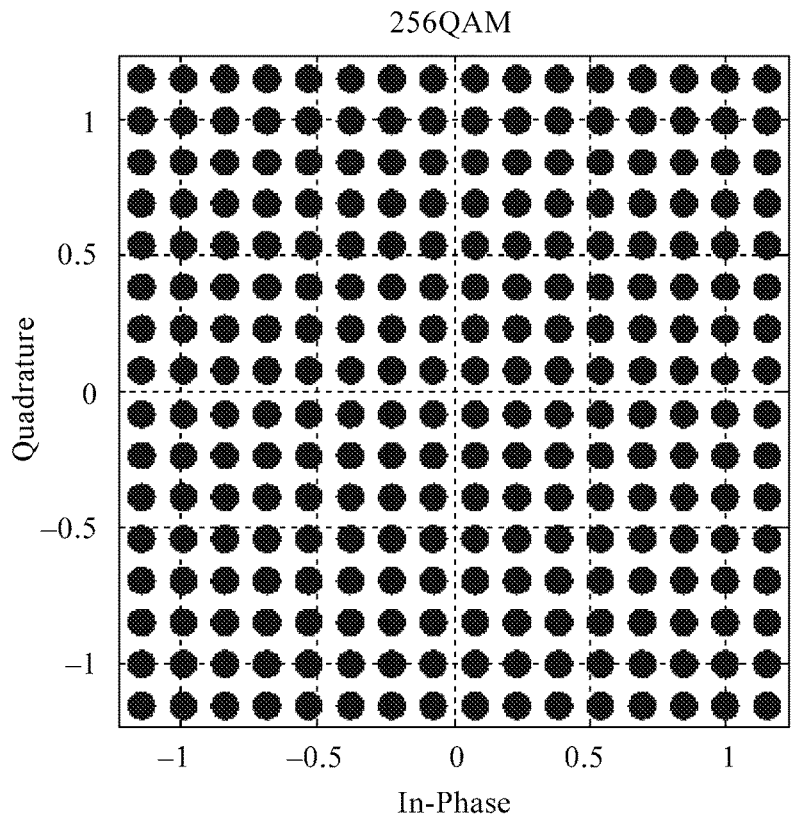
FIG. 11 is a 256QAM constellation diagram according to one embodiment of the present invention.

The 256QAM constellation diagram is shown in FIG. 11, and a precoding matrix $$Q = \frac{1}{\sqrt{85}} \begin{bmatrix} 8 & 4 & -2 & 1 \\ 4 & -8 & 1 & 2 \\ 2 & 1 & 8 & -4 \\ 1 & -2 & -4 & -8 \end{bmatrix}$$

is obtained according to four lower order modulation symbols and the 256QAM constellation diagram.

Specifically, one 256QAM symbol can be split into combinations of the four QPSK symbols that is $s=(\pm 8)*s_0+(\pm 4)*s_1+(\pm 2)*s_2+(\pm 1)*s_3$. A coefficient combination $(\pm 8, \pm 4, \pm 2, \pm 1)$ is used as a start point for finding a combination Q that can generate an orthogonal matrix.

It is easy to learn that the coefficient combination $(\pm 8,\pm 4,\pm 2,\pm 1)$ may generate 384 different row vectors, and a generation method is as follows:

(1) 16 row vectors are first generated in the following according to an order of $(\pm 8,\pm 4,\pm 2,\pm 1)$:

(8, 4, 2, 1), (8, 4, 2, −1), (8, 4, −2, 1), (8, 4, −2, −1), (8, −4, 2, 1), (8, −4, 2, −1), (8, −4, −2, 1), (8, −4, −2, −1), (−8, 4, 2, 1), (−8, 4, 2, −1), (−8, 4, −2, 1), (−8, 4, −2, −1), (−8, −4, 2, 1), (−8, −4, 2, −1), (−8, −4, −2, 1), and (−8, −4, −2, −1).

Cyclic shift is performed on the foregoing generated 16 vectors, and 64 row vectors are generated. (8, 4, 2, 1) is used as an example, and four row vectors can be generated: (8, 4, 2, 1), (1, 8, 4, 2), (2, 1, 8, 4), and (4, 2, 1, 8). By analogy, 64 row vectors can be generated in total.

(2) Further, 64×5 row vectors are generated in the following according to an order of $(\pm 8, \pm 4, \pm 1, \pm 2), (\pm 8, \pm 2, \pm 4, \pm 1), (\pm 8, \pm 2, \pm 1, \pm 4), (\pm 8, \pm 1, \pm 2, \pm 4),$ and $(\pm 8, \pm 1, \pm 4, \pm 2)$.

Generally, a value of a first row vector is first fixed at (8, 4, −2, 1), and then the remaining 383 row vectors are searched for a row vector orthogonal to the first row vector, and the found row vector is (4, −8, 1, 2). After the first row vector and a second row vector are determined, the remaining 382 row vectors are searched for a row vector orthogonal to both the first row vector and the second row vector, and a value of the found row vector is (2, 1, 8, −4). By analogy, the remaining 381 row vectors are searched for a row vector orthogonal to the first row vector, the second row vector, and the third row vector, and a value of the found row vector is (1, −2, −4, −8).

$$\begin{bmatrix} s_0 \\ s_1 \\ s_2 \\ s_3 \end{bmatrix}$$

is the column vector including the four QPSK symbols, and the four higher order modulation symbols are respectively $x_1, x_2, x_3,$ and $x_4$, and $$\begin{bmatrix} x_0 \\ x_1 \\ x_2 \\ x_3 \end{bmatrix} = \frac{1}{\sqrt{85}} \begin{bmatrix} 8 & 4 & -2 & 1 \\ 4 & -8 & 1 & 2 \\ 2 & 1 & 8 & -4 \\ 1 & -2 & -4 & -8 \end{bmatrix} \begin{bmatrix} s_0 \\ s_1 \\ s_2 \\ s_3 \end{bmatrix}.$$

S1003. Send $x_0$ on a first subcarrier of a first transmit antenna; send $x_1$ on a first subcarrier of a second transmit antenna; send $x_2$ on a second subcarrier of the first transmit antenna; and send $x_3$ on a second subcarrier of the second transmit antenna.

In this embodiment, the eight information bits are modulated according to the QPSK constellation diagram, and four QPSK symbols are generated; the precoding matrix Q is multiplied by the column vector including the four QPSK symbols, to obtain the four higher order modulation symbols corresponding to the 256QAM constellation diagram; and $x_0$ is sent on the first subcarrier of the first transmit antenna, $x_1$ is sent on the first subcarrier of the second transmit antenna, $x_2$ is sent on the second subcarrier of the first transmit antenna, and $x_3$ is sent on the second subcarrier of the second transmit antenna. It can be learned that $s_0$ is simultaneously sent on the first subcarrier and the second subcarrier, and sent on the first transmit antenna and the second transmit antenna, and both frequency diversity and space diversity are implemented; $s_1$ is simultaneously sent on the first subcarrier and the second subcarrier, and sent on the first transmit antenna and the second transmit antenna, and both the frequency diversity and the space diversity are implemented; $s_2$ is simultaneously sent on the first subcarrier and the second subcarrier, and sent on the first transmit antenna and the second transmit antenna, and both the frequency diversity and the space diversity are implemented; and $s_3$ is simultaneously sent on the first subcarrier and the second subcarrier, and sent on the first transmit antenna and the second transmit antenna, and both the frequency diversity and the space diversity are implemented, so that transceiving performance of data transmission is improved.

Figure 12:
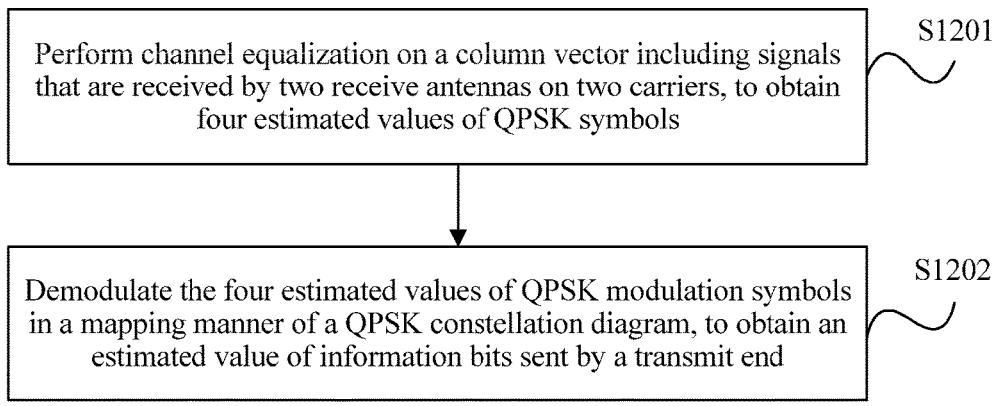
FIG. 12 is a schematic flowchart of Embodiment 8 of a data transmission method according to one embodiment of the present invention.
Figure 13:
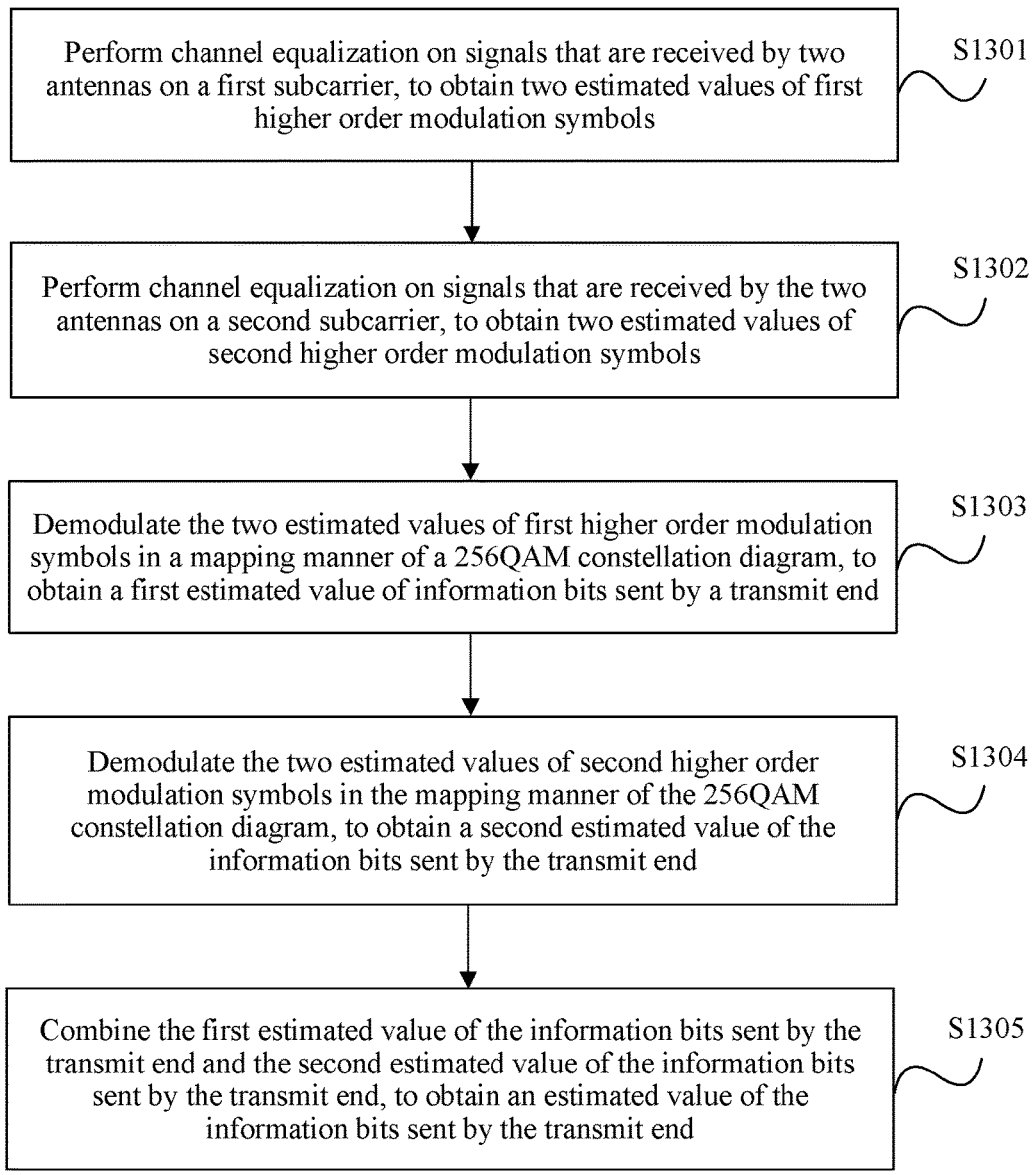
FIG. 13 is a schematic flowchart of Embodiment 9 of a data transmission method according to one embodiment of the present invention.

In the first implementation, there are two processing manners at a receive end. A first manner is shown in FIG. 12, and a second manner is shown in FIG. 13. The first manner is described first.

As shown in FIG. 12:

S1201. Perform channel equalization on a column vector including signals that are received by two receive antennas on two carriers, to obtain four estimated values of QPSK symbols.

The column vector including signals that are received by the two receive antennas on the two carriers is $$\begin{bmatrix} r_{1,1} \\ r_{2,1} \\ r_{1,2} \\ r_{2,2} \end{bmatrix},$$

and $$\begin{bmatrix} r_{1,1} \\ r_{2,1} \\ r_{1,2} \\ r_{2,2} \end{bmatrix} = \begin{bmatrix} h_{11,1} & h_{12,1} & 0 & 0 \\ h_{21,1} & h_{22,1} & 0 & 0 \\ 0 & 0 & h_{11,2} & h_{12,2} \\ 0 & 0 & h_{21,2} & h_{22,2} \end{bmatrix} \frac{1}{\sqrt{85}} \begin{bmatrix} 8 & 4 & -2 & 1 \\ 4 & -8 & 1 & 2 \\ 2 & 1 & 8 & -4 \\ 1 & -2 & -4 & -8 \end{bmatrix} \begin{bmatrix} s_0 \\ s_1 \\ s_2 \\ s_3 \end{bmatrix},$$

where $r_{1,1}$ represents a signal received by a first receive antenna on a first subcarrier, $r_{2,1}$ represents a signal received by a second receive antenna on the first subcarrier, $r_{1,2}$ represents a signal received by the first receive antenna on a second subcarrier, and $r_{2,2}$ represents a signal received by the second receive antenna on the second subcarrier. $h_{11,1}$ represents a channel response that is from a first transmit antenna to the first receive antenna and that is on the first subcarrier; $h_{12,1}$ represents a channel response that is from the first transmit antenna to the second receive antenna and that is on the first subcarrier; $h_{21,1}$ represents a channel response that is from a second transmit antenna to the first receive antenna and that is on the first subcarrier; $h_{22,1}$ represents a channel response that is from the second transmit antenna to the second receive antenna and that is on the first subcarrier; $h_{11,2}$ represents a channel response that is from the first transmit antenna to the first receive antenna and that is on the second subcarrier; $h_{12,2}$ represents a channel response that is from the first transmit antenna to the second receive antenna and that is on the second subcarrier; $h_{21,2}$ represents a channel response that is from the second transmit antenna to the first receive antenna and that is on the second subcarrier; and $h_{22,2}$ represents a channel response that is from the second transmit antenna to the second receive antenna and that is on the second subcarrier.

The four estimated values of QPSK symbols are respectively represented as $\hat{s}_0$, $\hat{s}_1$, $\hat{s}_2$, and $\hat{s}_3$, and $$\begin{bmatrix} \hat{s}_0 \\ \hat{s}_1 \\ \hat{s}_2 \\ \hat{s}_3 \end{bmatrix} = W \begin{bmatrix} r_{1,1} \\ r_{2,1} \\ r_{1,2} \\ r_{2,2} \end{bmatrix}.$$

W is a channel equalization matrix. If a linear minimum mean square error method is used, a corresponding channel equalization matrix is $W=(G^H G+\delta^2 I_4)^{-1} G^H$; or if a zero forcing method is used, a corresponding channel equalization matrix is $W=G^{-1}$, where $$G = \begin{bmatrix} h_{11,1} & h_{12,1} & 0 & 0 \\ h_{21,1} & h_{22,1} & 0 & 0 \\ 0 & 0 & h_{11,2} & h_{12,2} \\ 0 & 0 & h_{21,2} & h_{22,2} \end{bmatrix} Q,$$

$\delta^2$ is noise power, $I_4$ is a fourth-order identity matrix, and $(\ )^{-1}$ represents matrix inversion.

S1202. Demodulate the four estimated values of QPSK modulation symbols in a mapping manner of a QPSK constellation diagram, to obtain an estimated value of information bits sent by a transmit end.

In this embodiment, the channel equalization is performed on the column vector including the signals that are received by the two receive antennas on the two carriers, to obtain the four estimated values of QPSK symbols; and the four estimated values of QPSK modulation symbols are demodulated in the mapping manner of the QPSK constellation diagram, to obtain the estimated value of the information bits sent by the transmit end, that is, the estimated value of the information bits sent by the transmit end is obtained in the manner of joint demodulation. The same signal can be simultaneously received by multiple receive antennas on different carriers, and frequency diversity and space diversity are implemented, so that transceiving performance of data transmission is improved.

The Second Manner:

As shown in FIG. 13:

S1301. Perform channel equalization on signals that are received by two antennas on a first subcarrier, to obtain two estimated values of first higher order modulation symbols.

The signals that are received by the two antennas on the first subcarrier may be represented as:

$$\begin{bmatrix} r_{1,1} \\ r_{2,1} \end{bmatrix} = \begin{bmatrix} h_{11,1} & h_{12,1} \\ h_{21,1} & h_{22,1} \end{bmatrix} \begin{bmatrix} x_0 \\ x_1 \end{bmatrix},$$

where $r_{1,1}$ represents a signal received by a first receive antenna on the first subcarrier, and $r_{2,1}$ represents a signal received by a second receive antenna on the first subcarrier.

The channel equalization is performed on the signals $$\begin{bmatrix} r_{1,1} \\ r_{2,1} \end{bmatrix}$$

that are received on the first subcarrier, to obtain the two estimated values that are of the first higher order modulation symbols and that are respectively $\hat{x}_0$ and $\hat{x}_1$, and $$\begin{bmatrix} \hat{x}_0 \\ \hat{x}_1 \end{bmatrix} = W \begin{bmatrix} r_{1,1} \\ r_{2,1} \end{bmatrix},$$

where W is a channel equalization matrix. If a linear minimum mean square error method is used, a corresponding channel equalization matrix is $W=(G^H G+\delta^2 I_4)^{-1} G^H$; or if a zero forcing method is used, a corresponding channel equalization matrix is $W=G^{-1}$, where $$G = \begin{bmatrix} h_{11,1} & h_{12,1} \\ h_{21,2} & h_{22,2} \end{bmatrix},$$

$\delta^2$ is noise power, $I_4$ is a fourth-order identity matrix, and $(\ )^{-1}$ represents matrix inversion.

S1302. Perform channel equalization on signals that are received by the two antennas on a second subcarrier, to obtain two estimated values of second higher order modulation symbols.

The signals that are received by the two antennas on the second subcarrier may be represented as:

$$\begin{bmatrix} r_{1,2} \\ r_{2,2} \end{bmatrix} = \begin{bmatrix} h_{11,2} & h_{12,2} \\ h_{21,2} & h_{22,2} \end{bmatrix} \begin{bmatrix} x_2 \\ x_3 \end{bmatrix},$$

where $r_{1,2}$ represents a signal received by the first receive antenna on the second subcarrier, and $r_{2,2}$ represents a signal received by the second receive antenna on the second subcarrier.

The channel equalization is performed on the signals $$\begin{bmatrix} r_{1,2} \\ r_{2,2} \end{bmatrix}$$

that are received on the second subcarrier, to obtain the two estimated values that are of the second higher order modulation symbols and that are respectively $\hat{x}_2$ and $\hat{x}_3$, and $$\begin{bmatrix} \hat{x}_2 \\ \hat{x}_3 \end{bmatrix} = W \begin{bmatrix} r_{1,2} \\ r_{2,2} \end{bmatrix},$$

where W is a channel equalization matrix. If a linear minimum mean square error method is used, a corresponding channel equalization matrix is $W=(G^H G+\delta^2 I_4)^{-1}G^H$; or if a zero forcing method is used, a corresponding channel equalization matrix is $W=G^{-1}$, where $$G = \begin{bmatrix} h_{11,2} & h_{12,2} \\ h_{21,2} & h_{22,2} \end{bmatrix},$$

$\delta^2$ is noise power, $I_4$ is a fourth-order identity matrix, and $(\ )^{-1}$ represents matrix inversion.

S1303. Demodulate the two estimated values of first higher order modulation symbols in a mapping manner of a 256QAM constellation diagram, to obtain a first estimated value of information bits sent by a transmit end.

The first estimated value may be represented as:
$\hat{b}_0, \hat{b}_1, \hat{b}_2, \hat{b}_3, \hat{b}_4, \hat{b}_5, \hat{b}_6$ and $\hat{b}_7$.

S1304. Demodulate the two estimated values of second higher order modulation symbols in the mapping manner of the 256QAM constellation diagram, to obtain a second estimated value of the information bits sent by the transmit end.

The second estimated value may be represented as:
$\bar{b}_0, \bar{b}_1, \bar{b}_2, \bar{b}_3, \bar{b}_4, \bar{b}_5, \bar{b}_6$ and $\bar{b}_7$.

S1305. Combine the first estimated value of the information bits sent by the transmit end and the second estimated value of the information bits sent by the transmit end, to obtain an estimated value of the information bits sent by the transmit end.

The estimated value of the information bits sent by the transmit end is $\tilde{b}_0, \tilde{b}_1, \tilde{b}_2, \tilde{b}_3, b^{o/c}{}_4, b^{o/c}{}_5, b^{o/c}{}_6$, or $b^{o/c}{}_7$, where $\tilde{b}_k=(\hat{b}_k+\bar{b}_k)/2$, and k=0, 1, 2, 3, 4, 5, 6, or 7.

In this embodiment, the channel equalization is performed on the signals that are received by the two antennas on the first subcarrier, to obtain the two estimated values of first higher order modulation symbols; the channel equalization is performed on the signals that are received by the two antennas on the second subcarrier, to obtain two estimated values of second higher order modulation symbols; the two estimated values of first higher order modulation symbols are demodulated in the mapping manner of the 256QAM constellation diagram, to obtain the first estimated value of the information bits sent by the transmit end; the two estimated values of second higher order modulation symbols are demodulated in the mapping manner of the 256QAM constellation diagram, to obtain the second estimated value of the information bits sent by the transmit end; and the first estimated value of the information bits sent by the transmit end and the second estimated value of the information bits sent by the transmit end are combined, to obtain the estimated value of the information bits sent by the transmit end, that is, the estimated value of the information bits sent by the transmit end is obtained in the manner of performing independent demodulation and then performing combination. The same signal can be simultaneously received by multiple receive antennas on different carriers, and frequency diversity and space diversity are implemented, so that transceiving performance of data transmission is improved.

Figure 14:
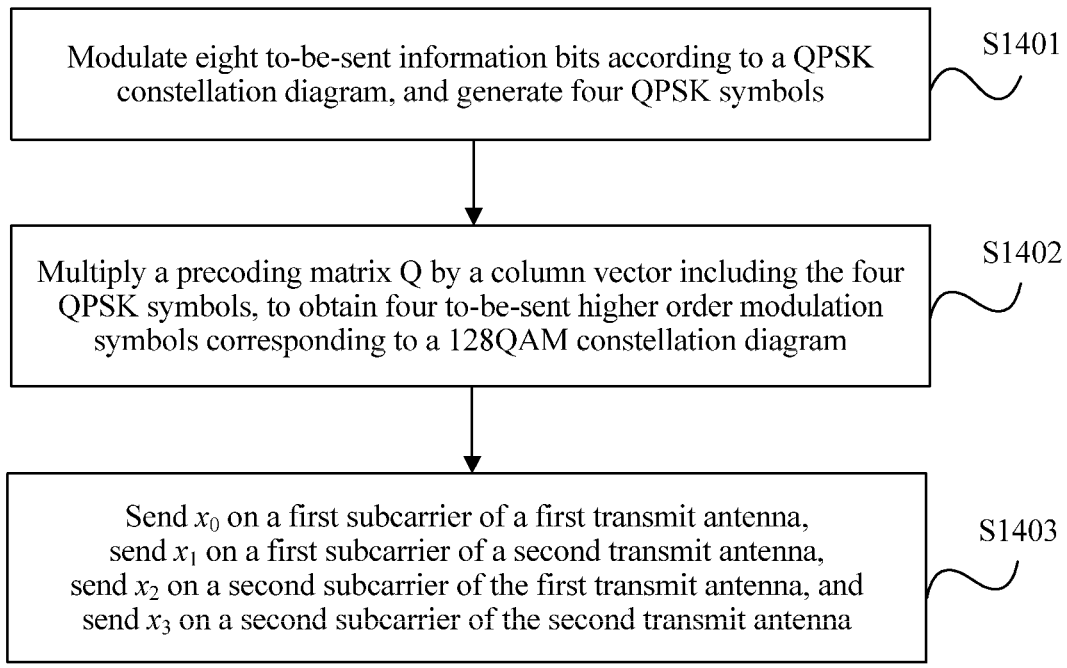
FIG. 14 is a schematic flowchart of Embodiment 10 of a data transmission method according to one embodiment of the present invention.

In one embodiment, a flowchart at a transmit end is shown in FIG. 14.

S1401. Modulate eight information bits according to a QPSK constellation diagram, and generate four QPSK symbols.

The QPSK constellation diagram is shown in FIG. 7, the eight information bits are respectively $b_k$, where k=0, 1, . . . , or 7, and the four QPSK symbols are respectively $s_0$, $s_1$, $s_2$, and $s_3$, where $s_k=(2*b_{2k}-1)+j(2*b_{2k+1}-1)$, and k=0, 1, 2, or 3.

S1402. Multiply a precoding matrix Q by a column vector including the four QPSK symbols, to obtain four higher order modulation symbols corresponding to a 128QAM constellation diagram.

Figure 15:
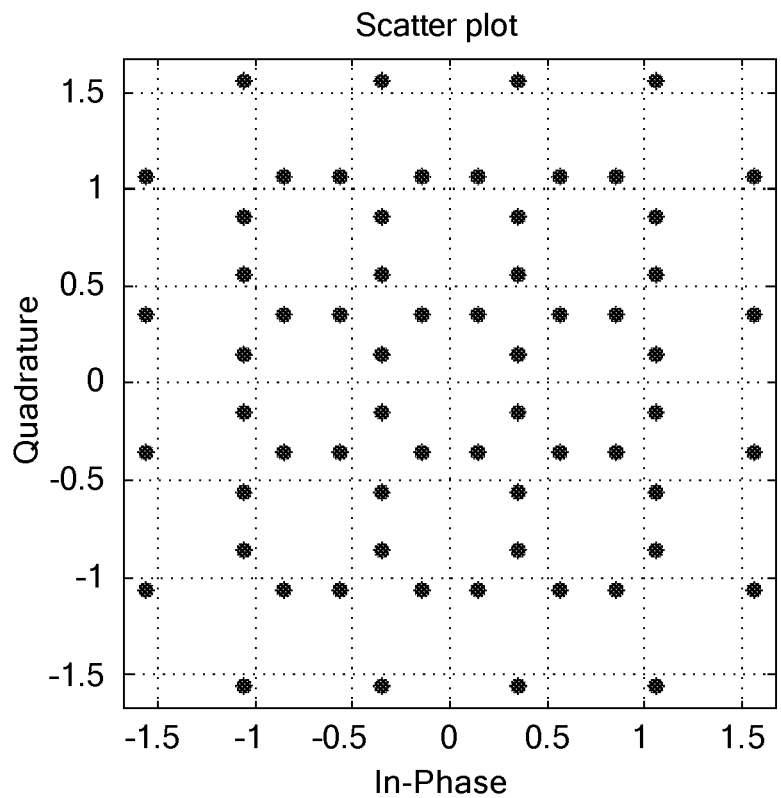
FIG. 15 is a 128QAM constellation diagram according to one embodiment of the present invention.

The 128QAM constellation diagram is shown in FIG. 15, and a precoding matrix $$Q = \frac{1}{2}\begin{bmatrix} 1 & 1 & 1 & e^{j0.25\pi} \\ 1 & 1 & -1 & -e^{j0.25\pi} \\ 1 & -1 & -1 & e^{j0.25\pi} \\ 1 & -1 & 1 & -e^{j0.25\pi} \end{bmatrix}$$

is obtained according to four lower order modulation symbols and the 128QAM constellation diagram. Specifically, the 128QAM constellation diagram is similar to the 256QAM constellation diagram, but a difference lies in that a coefficient combination is $(\pm 1, \pm 1, \pm 1, e^{\pm j0.25\pi})$.

$$\begin{bmatrix} s_0 \\ s_1 \\ s_2 \\ s_3 \end{bmatrix}$$

is the column vector including the four QPSK symbols, and the four to-be-sent higher order modulation symbols are respectively $x_0$, $x_1$, $x_2$, and $x_3$, and $$\begin{bmatrix} x_0 \\ x_1 \\ x_2 \\ x_3 \end{bmatrix} = \frac{1}{2} \begin{bmatrix} 1 & 1 & 1 & e^{j0.25\pi} \\ 1 & 1 & -1 & -e^{j0.25\pi} \\ 1 & -1 & -1 & e^{j0.25\pi} \\ 1 & -1 & 1 & -e^{j0.25\pi} \end{bmatrix} \begin{bmatrix} s_0 \\ s_1 \\ s_2 \\ s_3 \end{bmatrix}.$$

S1403. Send $x_0$ on a first subcarrier of a first transmit antenna; send $x_1$ on a first subcarrier of a second transmit antenna; send $x_2$ on a second subcarrier of the first transmit antenna; and send $x_3$ on a second subcarrier of the second transmit antenna.

In this embodiment, the eight information bits are modulated according to the QPSK constellation diagram, and four QPSK symbols are generated; the precoding matrix Q is multiplied by the column vector including the four QPSK symbols, to obtain the four higher order modulation symbols corresponding to the 128QAM constellation diagram; and $x_0$ is sent on the first subcarrier of the first transmit antenna, $x_1$ is sent on the first subcarrier of the second transmit antenna, $x_2$ is sent on the second subcarrier of the first transmit antenna, and $x_3$ is sent on the second subcarrier of the second transmit antenna. It can be learned that $s_0$ is simultaneously sent on the first subcarrier and the second subcarrier, and sent on the first transmit antenna and the second transmit antenna, and both frequency diversity and space diversity are implemented; $s_1$ is simultaneously sent on the first subcarrier and the second subcarrier, and sent on the first transmit antenna and the second transmit antenna, and both the frequency diversity and the space diversity are implemented; $s_2$ is simultaneously sent on the first subcarrier and the second subcarrier, and sent on the first transmit antenna and the second transmit antenna, and both the frequency diversity and the space diversity are implemented; and $s_3$ is simultaneously sent on the first subcarrier and the second subcarrier, and sent on the first transmit antenna and the second transmit antenna, and both the frequency diversity and the space diversity are implemented, so that transceiving performance of data transmission is improved.

A processing manner at the receive end is shown in FIG. 16 according to one embodiment.

S1601. Perform channel equalization on a column vector including signals that are received by two receive antennas on two carriers, to obtain four estimated values of QPSK symbols.

The column vector including signals that are received by the two receive antennas on the two carriers is $$\begin{bmatrix} r_{1,1} \\ r_{2,1} \\ r_{1,2} \\ r_{2,2} \end{bmatrix},$$

and $$\begin{bmatrix} r_{1,1} \\ r_{2,1} \\ r_{1,2} \\ r_{2,2} \end{bmatrix} = \begin{bmatrix} h_{11,1} & h_{12,1} & 0 & 0 \\ h_{21,1} & h_{22,1} & 0 & 0 \\ 0 & 0 & h_{11,2} & h_{12,2} \\ 0 & 0 & h_{21,2} & h_{22,2} \end{bmatrix} \frac{1}{2} \begin{bmatrix} 1 & 1 & 1 & e^{j0.25\pi} \\ 1 & 1 & -1 & -e^{j0.25\pi} \\ 1 & -1 & -1 & e^{j0.25\pi} \\ 1 & -1 & 1 & -e^{j0.25\pi} \end{bmatrix} \begin{bmatrix} s_0 \\ s_1 \\ s_2 \\ s_3 \end{bmatrix},$$

where $r_{1,1}$ represents a signal received by a first receive antenna on a first subcarrier, $r_{2,1}$ represents a signal received by a second receive antenna on the first subcarrier, $r_{1,2}$ represents a signal received by the first receive antenna on a second subcarrier, and $r_{2,2}$ represents a signal received by the second receive antenna on the second subcarrier. $h_{11,1}$ represents a channel response that is from a first transmit antenna to the first receive antenna and that is on the first subcarrier; $h_{12,1}$ represents a channel response that is from the first transmit antenna to the second receive antenna and that is on the first subcarrier; $h_{21,1}$ represents a channel response that is from a second transmit antenna to the first receive antenna and that is on the first subcarrier; $h_{22,1}$ represents a channel response that is from the second transmit antenna to the second receive antenna and that is on the first subcarrier; $h_{11,2}$ represents a channel response that is from the first transmit antenna to the first receive antenna and that is on the second subcarrier; $h_{12,2}$ represents a channel response that is from the first transmit antenna to the second receive antenna and that is on the second subcarrier; $h_{21,2}$ represents a channel response that is from the second transmit antenna to the first receive antenna and that is on the second subcarrier; and $h_{22,2}$ represents a channel response that is from the second transmit antenna to the second receive antenna and that is on the second subcarrier.

The four estimated values of QPSK symbols are respectively represented as $\hat{s}_0$, $\hat{s}_1$, $\hat{s}_2$, and $\hat{s}_3$, and $$\begin{bmatrix} \hat{s}_0 \\ \hat{s}_1 \\ \hat{s}_2 \\ \hat{s}_3 \end{bmatrix} = W \begin{bmatrix} r_{1,1} \\ r_{2,1} \\ r_{1,2} \\ r_{2,2} \end{bmatrix}.$$

W is a channel equalization matrix. If a linear minimum mean square error method is used, a corresponding channel equalization matrix is $W = (G^H G + \delta^2 I_4)^{-1} G^H$; or if a zero forcing method is used, a corresponding channel equalization matrix is $W = G^{-1}$, where $$G = \begin{bmatrix} h_{11,1} & h_{12,1} & 0 & 0 \\ h_{21,1} & h_{22,1} & 0 & 0 \\ 0 & 0 & h_{11,2} & h_{12,2} \\ 0 & 0 & h_{21,2} & h_{22,2} \end{bmatrix} Q,$$

$\delta^2$ is noise power, $I_4$ is a fourth-order identity matrix, and $(\ )^{-1}$ represents matrix inversion.

S1602. Demodulate the four estimated values of QPSK modulation symbols in a mapping manner of a QPSK constellation diagram, to obtain an estimated value of information bits sent by a transmit end.

In this embodiment, the channel equalization is performed on the column vector including the signals that are received by the two receive antennas on the two carriers, to obtain the four estimated values of QPSK symbols; and the four estimated values of QPSK modulation symbols are demodulated in the mapping manner of the QPSK constellation diagram, to obtain the estimated value of the information bits sent by the transmit end, that is, the estimated value of the information bits sent by the transmit end is obtained in the manner of joint demodulation. The same signal can be simultaneously received by multiple receive antennas on different carriers, and frequency diversity and space diversity are implemented, so that transceiving performance of data transmission is improved.

FIG. 17 is a schematic structural diagram of Embodiment 1 of a data transmission apparatus according to the present invention. As shown in FIG. 17, the apparatus in this embodiment includes a modulation module 1701, a processing module 1702, and a sending module 1703. The modulation module 1701 is configured to modulate to-be-sent information bits according to a lower order constellation diagram, and generate 4 m lower order modulation symbols, where m is an integer greater than or equal to 1. The processing module 1702 is configured to separately multiply a precoding matrix Q by a column vector including every four lower order modulation symbols in the 4 m lower order modulation symbols, to obtain 4 m to-be-sent higher order modulation symbols corresponding to a higher order constellation diagram. The sending module 1703 is configured to respectively and correspondingly send the 4 m to-be-sent higher order modulation symbols on different carriers of two antennas.

In the foregoing embodiment, the 4 m higher order modulation symbols are classified into four types, a $4(i-1)+1_{th}$ higher order modulation symbol is a first higher order modulation symbol, a $4(i-1)+2_{th}$ higher order modulation symbol is a second higher order modulation symbol, $4(i-1)+3_{th}$ higher order modulation symbol is a third higher order modulation symbol, and a $4(i-1)+4_{th}$ higher order modulation symbol is a fourth higher order modulation symbol, where $1 \leq i \leq l$, and i is an integer.

The sending module is configured to send the first higher order modulation symbol on a first subcarrier of a first transmit antenna; send the second higher order modulation symbol on a first subcarrier of a second transmit antenna; send the third higher order modulation symbol on a second subcarrier of the first transmit antenna; and send the fourth higher order modulation symbol on a second subcarrier of the second transmit antenna.

In the foregoing embodiment, the processing module 1702 is configured to:
multiply a precoding matrix by a column vector $$Q = \frac{1}{\sqrt{85}} \begin{bmatrix} 8 & 4 & -2 & 1 \\ 4 & -8 & 1 & 2 \\ 2 & 1 & 8 & -4 \\ 1 & -2 & -4 & -8 \end{bmatrix}$$

by a column vector $[s_0\ s_1\ s_2\ s_3]^T$ including four quadrature phase shift keying QPSK symbols, to obtain four to-be-sent 256QAM modulation symbols that are corresponding to a 256 quadrature amplitude modulation QAM constellation diagram and that are respectively $[x_0\ x_1\ x_2\ x_3]^T$, where $x_0$ is the first higher order modulation symbol, $x_1$ is the second higher order modulation symbol, $x_2$ is the third higher order modulation symbol, $x_3$ is the fourth higher order modulation symbol, and $[\ ]^T$ represents transpose.

In the foregoing embodiment, the processing module 1702 is configured to:
multiply a precoding matrix $$Q = \frac{1}{2} \begin{bmatrix} 1 & 1 & 1 & e^{j0.25\pi} \\ 1 & 1 & -1 & -e^{j0.25\pi} \\ 1 & -1 & -1 & e^{j0.25\pi} \\ 1 & -1 & 1 & -e^{j0.25\pi} \end{bmatrix}$$

by a column vector $[s_0\ s_1\ s_2\ s_3]^T$ including four QPSK symbols, to obtain four 128QAM modulation symbols that are corresponding to a 128QAM constellation diagram and that are respectively $[x_0\ x_1\ x_2\ x_3]^T$, where $x_0$ is the first higher order modulation symbol, $x_1$ is the second higher order modulation symbol, $x_2$ is the third higher order modulation symbol, $x_3$ is the fourth higher order modulation symbol, and $[\ ]^T$ represents transpose.

In the foregoing embodiment, the processing module 1702 is configured to:
multiply a precoding matrix $$Q = \frac{1}{\sqrt{2}} \begin{bmatrix} 1 & j & 0 & 0 \\ 0 & 0 & 1 & -j \\ 1 & -j & 0 & 0 \\ j & 1 & 0 & 0 \end{bmatrix}$$

by a column vector $[s_0\ s_1\ s_2\ s_3]^T$ including four BPSK symbols, to obtain four modulation symbols that are corresponding to a QPSK constellation diagram and that are respectively $[x_0\ x_1\ x_2\ x_3]^T$, where $x_0$ is the first higher order modulation symbol, $x_1$ is the second higher order modulation symbol, $x_2$ is the third higher order modulation symbol, and $x_3$ is the fourth higher order modulation symbol.

The apparatus in this embodiment may be correspondingly configured to implement the technical solution in the method embodiment shown in FIG. 5, FIG. 10, or FIG. 14, and implementation principles and technical effects of the apparatus are similar and are not described herein again.

FIG. 18 is a structural diagram of a data transmission apparatus according to one embodiment of the present invention. As shown in FIG. 18, the apparatus in this embodiment includes a receiving module 1801, a channel equalization module 1802, and a demodulation module 1803. The receiving module 1801 is configured to receive signals on two carriers, where the receiving module is deployed on a first receive antenna and a second receive antenna, the two carriers are respectively a first subcarrier and a second subcarrier, and a signal received by the first receive antenna on the first subcarrier is $r_{11}$, a signal received by the second receive antenna on the first subcarrier is $r_{21}$, a signal received by the first receive antenna on the second subcarrier is $r_{12}$, and a signal received by the second receive antenna on the second subcarrier is $r_{22}$. The channel equalization module 1802 is configured to obtain 4 m estimated values of lower order modulation symbols after channel equalization is performed on $[r_{11}\ r_{21}\ r_{12}\ r_{22}]^T$, where m is an integer greater than or equal to 1. The demodulation module 1803 is configured to demodulate the 4 m estimated values of lower order modulation symbols according to a corresponding lower order constellation diagram, to obtain an estimated value of information bits sent by a transmit end.

In the foregoing embodiment, the lower order modulation symbol is a quadrature phase shift keying QPSK modulation symbol or a binary phase shift keying BPSK modulation symbol.

The apparatus in this embodiment may be correspondingly configured to implement the technical solution in the method embodiment shown in FIG. 8 or FIG. 12, and implementation principles and technical effects of the apparatus are similar and are not described herein again.

FIG. 19 is a structural diagram of a data transmission apparatus according to one embodiment of the present invention. As shown in FIG. 19, the apparatus in this embodiment includes a channel equalization module 1901, a demodulation module 1902, and a processing module 1903. The channel equalization module 1901 is configured to perform channel equalization on signals that are received by two antennas on a first subcarrier, to obtain 2 m estimated values of first higher order modulation symbols, where m is an integer greater than or equal to 1; and the channel equalization module 1901 is further configured to perform channel equalization on signals that are received by the two antennas on a second subcarrier, to obtain 2 m estimated values of second higher order modulation symbols. The demodulation module 1902 is configured to demodulate the 2 m estimated values of first higher order modulation symbols in a mapping manner of a higher order constellation diagram, to obtain a first estimated value of information bits sent by a transmit end; and the demodulation module 1902 is further configured to demodulate the 2 m estimated values of second higher order modulation symbols in the mapping manner of the higher order constellation diagram, to obtain a second estimated value of the information bits sent by the transmit end. The processing module 1903 is configured to combine the first estimated value of the information bits sent by the transmit end and the second estimated value of the information bits sent by the transmit end, to obtain an estimated value of the information bits sent by the transmit end.

In the foregoing embodiment, the higher order modulation symbol is a 256 quadrature amplitude modulation QAM modulation symbol or a quadrature phase shift keying QPSK modulation symbol.

The apparatus in this embodiment may be correspondingly configured to implement the technical solution in the method embodiment shown in FIG. 9, FIG. 13, or FIG. 16, and implementation principles and technical effects of the apparatus are similar and are not described herein again.

Figure 20:
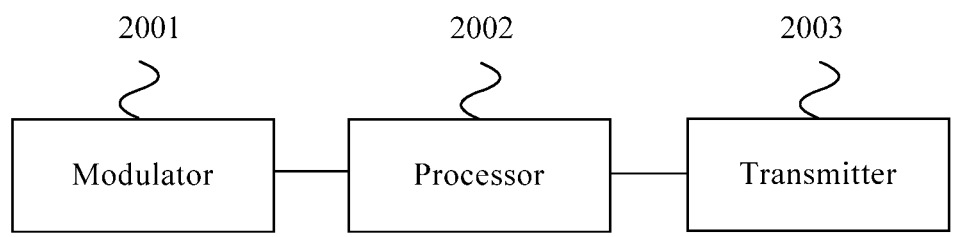
FIG. 20 is a schematic structural diagram of Embodiment 4 of a data transmission apparatus according to one embodiment of the present invention.

FIG. 20 is a structural diagram of a data transmission apparatus according to one embodiment of the present invention. As shown in FIG. 20, the apparatus in this embodiment includes a modulator 2001, a processor 2002, and a transmitter 2003. The modulator 2001 is configured to modulate to-be-sent information bits according to a lower order constellation diagram, and generate 4 m lower order modulation symbols, where m is an integer greater than or equal to 1. The processor 2002 is configured to separately multiply a precoding matrix Q by a column vector including every four lower order modulation symbols in the 4 m lower order modulation symbols, to obtain 4 m to-be-sent higher order modulation symbols corresponding to a higher order constellation diagram. The transmitter 2003 is configured to respectively and correspondingly send the 4 m to-be-sent higher order modulation symbols on different carriers of two antennas.

The apparatus in this embodiment may be correspondingly configured to implement the technical solution in the method embodiment shown in FIG. 5, FIG. 10, or FIG. 14, and implementation principles and technical effects of the apparatus are similar and are not described herein again.

Figure 21:
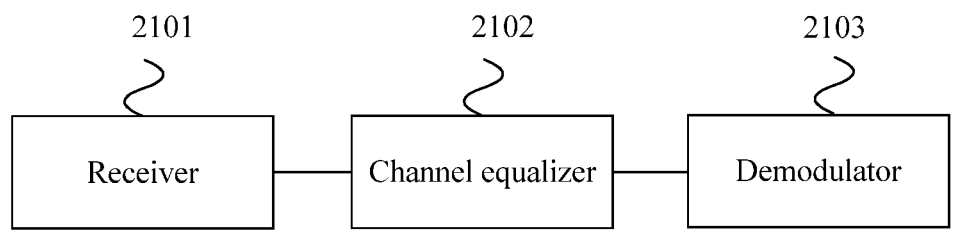
FIG. 21 is a schematic structural diagram of Embodiment 5 of a data transmission apparatus according to one embodiment of the present invention.

FIG. 21 is a structural diagram of a data transmission apparatus according to one embodiment of the present invention. The apparatus in this embodiment includes a receiver 2101, a channel equalizer 2102, and a demodulator 2103. The receiver 2101 is configured to receive signals on two carriers, where the receivers are deployed on a first receive antenna and a second receive antenna, the two carriers are respectively a first subcarrier and a second subcarrier, and a signal received by the first receive antenna on the first subcarrier is a signal received by the second receive antenna on the first subcarrier is $r_{11}$, a signal received by the first receive antenna on the second subcarrier is $r_{12}$, and a signal received by the second receive antenna on the second subcarrier is $r_{22}$.

The channel equalizer 2102 is configured to obtain 4 m estimated values of lower order modulation symbols after channel equalization is performed on $[r_{11}\ r_{21}\ r_{12}\ r_{22}]^T$, where m is an integer greater than or equal to 1. The demodulator 2103 is configured to demodulate the 4 m estimated values of lower order modulation symbols according to a corresponding lower order constellation diagram, to obtain an estimated value of information bits sent by a transmit end.

The apparatus in this embodiment may be correspondingly configured to implement the technical solution in the method embodiment shown in FIG. 8 or FIG. 12, and implementation principles and technical effects of the apparatus are similar and are not described herein again.

Figure 22:
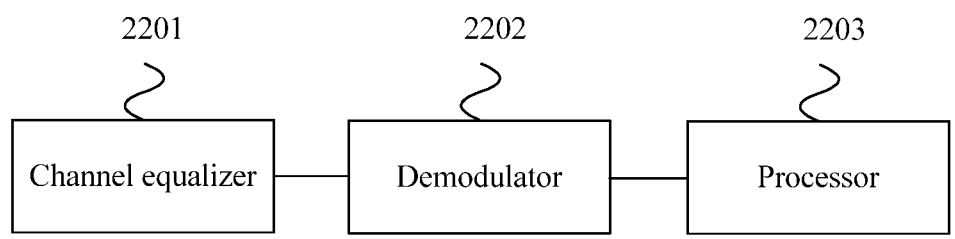
FIG. 22 is a schematic structural diagram of Embodiment 6 of a data transmission apparatus according to one embodiment of the present invention.

FIG. 22 is a structural diagram of a data transmission apparatus according to one embodiment of the present invention. The apparatus in this embodiment includes a channel equalizer 2201, a demodulator 2202, and a processor 2203. The channel equalizer 2201 is configured to perform channel equalization on signals that are received by two antennas on a first subcarrier, to obtain 2 m estimated values of first higher order modulation symbols, where m is an integer greater than or equal to 1; and the channel equalizer 2201 is further configured to perform channel equalization on signals that are received by the two antennas on a second subcarrier, to obtain 2 m estimated values of second higher order modulation symbols. The demodulator 2202 is configured to demodulate the 2 m estimated values of first higher order modulation symbols in a mapping manner of a higher order constellation diagram, to obtain a first estimated value of information bits sent by a transmit end; and the demodulator 2202 is further configured to demodulate the 2 m estimated values of second higher order modulation symbols in the mapping manner of the higher order constellation diagram, to obtain a second estimated value of the information bits sent by the transmit end. The processor 2203 is configured to combine the first estimated value of the information bits sent by the transmit end and the second estimated value of the information bits sent by the transmit end, to obtain an estimated value of the information bits sent by the transmit end.

The apparatus in this embodiment may be correspondingly configured to implement the technical solution in the method embodiment shown in FIG. 9, FIG. 13, or FIG. 16, and implementation principles and technical effects of the apparatus are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method in a transmitting apparatus, the method comprising:
   modulating, by the transmitting apparatus, information bits to be sent according to a lower order constellation diagram, and generating 4 m lower order modulation symbols, wherein m is an integer greater than or equal to 1;
   separately multiplying, by the transmitting apparatus, a precoding matrix Q by a column vector comprising every four lower order modulation symbols in the 4 m lower order modulation symbols, to obtain 4 m higher order modulation symbols to be sent corresponding to a higher order constellation diagram; and
   sending, by two antennas of the transmitting apparatus, the 4 m higher order modulation symbols on different carriers of the two antennas respectively to a receiving apparatus.

2. The method according to claim 1, wherein the 4 m higher order modulation symbols are classified into four types, including a first higher order modulation symbol, a second higher order modulation symbol, a third higher order modulation symbol, and a fourth higher order modulation symbol, wherein the first higher order modulation symbol includes a $4(i-1)+1_{th}$ higher order modulation symbol, the second higher order modulation symbol includes a $4(i-1)+2_{th}$ higher order modulation symbol, the third higher order modulation symbol includes a $4(i-1)+3_{th}$ higher order modulation symbol, and the fourth higher order modulation symbol includes a $4(i-1)+4_{th}$ higher order modulation symbol, wherein $1 \leq i \leq l$, and i is an integer.

3. The method of claim 2, wherein sending the 4 m higher order modulation symbols on different carriers of two antennas comprises:
   sending the first higher order modulation symbol on a first subcarrier of a first transmit antenna of the two antennas;
   sending the second higher order modulation symbol on a first subcarrier of a second transmit antenna of the two antennas;
   sending the third higher order modulation symbol on a second subcarrier of the first transmit antenna; and
   sending the fourth higher order modulation symbol on a second subcarrier of the second transmit antenna.

4. The method according to claim 2, wherein the separately multiplying a precoding matrix Q by a column vector comprises:
   multiplying a precoding matrix $$Q = \frac{1}{\sqrt{85}} \begin{bmatrix} 8 & 4 & -2 & 1 \\ 4 & -8 & 1 & 2 \\ 2 & 1 & 8 & -4 \\ 1 & -2 & -4 & -8 \end{bmatrix}$$

by a column vector $[s_0\ s_1\ s_2\ s_3]^T$ comprising four quadrature phase shift keying (QPSK) symbols, to obtain four 256QAM modulation symbols corresponding to a 256 quadrature amplitude modulation (QAM) constellation diagram and $[x_0\ x_1\ x_2\ x_3]^T$ respectively, wherein $x_0$ represents the first higher order modulation symbol, $x_1$ represents the second higher order modulation symbol, $x_2$ represents the third higher order modulation symbol, $x_3$ represents the fourth higher order modulation symbol, and $[\ ]^T$ represents transpose.

5. The method according to claim 2, wherein the separately multiplying a precoding matrix Q by a column vector comprises:
   multiplying a precoding matrix $$Q = \frac{1}{2} \begin{bmatrix} 1 & 1 & 1 & e^{j0.25\pi} \\ 1 & 1 & -1 & -e^{j0.25\pi} \\ 1 & -1 & -1 & e^{j0.25\pi} \\ 1 & -1 & 1 & -e^{j0.25\pi} \end{bmatrix}$$

by a column vector $[s_0\ s_1\ s_2\ s_3]^T$ comprising four QPSK symbols, to obtain four 128QAM modulation symbols corresponding to a 128QAM constellation diagram and $[x_0\ x_1\ x_2\ x_3]^T$ respectively, wherein $x_0$ represents the first higher order modulation symbol, $x_1$ represents the second higher order modulation symbol, $x_2$ represents the third higher order modulation symbol, $x_3$ represents the fourth higher order modulation symbol, and $[\ ]^T$ represents transpose.

6. The method according to claim 2, wherein the separately multiplying a precoding matrix Q by a column vector comprises:
   multiplying a precoding matrix $$Q = \frac{1}{\sqrt{2}} \begin{bmatrix} 1 & j & 0 & 0 \\ 0 & 0 & 1 & -j \\ 1 & -j & 0 & 0 \\ j & 1 & 0 & 0 \end{bmatrix}$$

by a column vector $[s_0\ s_1\ s_2\ s_3]^T$ comprising four BPSK symbols, to obtain four modulation symbols corresponding to a QPSK constellation diagram and $[x_0\ x_1\ x_2\ x_3]^T$ respectively, wherein $x_0$ represents the first higher order modulation symbol, $x_1$ represents the second higher order modulation symbol, $x_2$ represents the third higher order modulation symbol, and $x_3$ represents the fourth higher order modulation symbol.

7. A data transmission apparatus, comprising:
   a modulator configured to modulate information bits to be sent according to a lower order constellation diagram and to generate 4 m lower order modulation symbols, wherein m is an integer greater than or equal to 1;
   a processor configured to separately multiply a precoding matrix Q by a column vector comprising every four lower order modulation symbols in the 4 m lower order modulation symbols, to obtain 4 m higher order modulation symbols to be sent corresponding to a higher order constellation diagram; and
   a transmitter configured to respectively send the 4 m higher order modulation symbols on different carriers of two antennas to a receiving apparatus.

8. The apparatus according to claim 7, wherein the 4 m higher order modulation symbols are classified into four types, including a first higher order modulation symbol, a second higher order modulation symbol, a third higher order modulation symbol, and a fourth higher order modulation symbol, wherein the first higher order modulation symbol includes a $4(i-1)+1_{th}$ higher order modulation symbol, the second higher order modulation symbol includes a $4(i-1)+2_{th}$ higher order modulation symbol, the third higher order modulation symbol includes a $4(i-1)+3_{th}$ higher order modulation symbol, and the fourth higher order modulation symbol includes a $4(i-1)+4_{th}$ higher order modulation symbol.

9. The apparatus according to claim 8, wherein the transmitter is further configured to:
   send the first higher order modulation symbol on a first subcarrier of a first transmit antenna of the two antenna;
   send the second higher order modulation symbol on a first subcarrier of a second transmit antenna of the two antenna;
   send the third higher order modulation symbol on a second subcarrier of the first transmit antenna; and
   send the fourth higher order modulation symbol on a second subcarrier of the second transmit antenna.

10. The apparatus according to claim 8, wherein the processor is further configured to:
   multiply a precoding matrix $$Q = \frac{1}{\sqrt{85}} \begin{bmatrix} 8 & 4 & -2 & 1 \\ 4 & -8 & 1 & 2 \\ 2 & 1 & 8 & -4 \\ 1 & -2 & -4 & -8 \end{bmatrix}$$

by a column vector $[s_0\ s_1\ s_2\ s_3]^T$ comprising four quadrature phase shift keying QPSK symbols, to obtain four 256QAM modulation symbols corresponding to a 256 quadrature amplitude modulation QAM constellation diagram and $[x_0\ x_1\ x_2\ x_3]^T$ respectively, wherein $x_0$ represents the first higher order modulation symbol, $x_1$ represents the second higher order modulation symbol, $x_2$ represents the third higher order modulation symbol, $x_3$ represents the fourth higher order modulation symbol, and $[\ ]^T$ represents transpose.

11. The apparatus according to claim 8, wherein the processor is further configured to:
   multiply a precoding matrix $$Q = \frac{1}{2} \begin{bmatrix} 1 & 1 & 1 & e^{j0.25\pi} \\ 1 & 1 & -1 & -e^{j0.25\pi} \\ 1 & -1 & -1 & e^{j0.25\pi} \\ 1 & -1 & 1 & -e^{j0.25\pi} \end{bmatrix}$$

by a column vector $[s_0\ s_1\ s_2\ s_3]^T$ comprising four QPSK symbols, to obtain four 128QAM modulation symbols corresponding to a 128QAM constellation diagram and $[x_0\ x_1\ x_2\ x_3]^T$ respectively, wherein $x_0$ represents the first higher order modulation symbol, $x_1$ represents the second higher order modulation symbol, $x_2$ represents the third higher order modulation symbol, $x_3$ represents the fourth higher order modulation symbol, and $[\ ]^T$ represents transpose.

12. The apparatus according to claim 8, wherein the processor is further configured to:
   multiply a precoding matrix $$Q = \frac{1}{\sqrt{2}} \begin{bmatrix} 1 & j & 0 & 0 \\ 0 & 0 & 1 & -j \\ 1 & -j & 0 & 0 \\ j & 1 & 0 & 0 \end{bmatrix}$$

by a column vector $[s_0\ s_1\ s_2\ s_3]^T$ comprising four BPSK symbols, to obtain four modulation symbols corresponding to a QPSK constellation diagram and $[x_0\ x_1\ x_2\ x_3]^T$ respectively, wherein $x_0$ represents the first higher order modulation symbol, $x_1$ represents the second higher order modulation symbol, $x_2$ represents the third higher order modulation symbol, and $x_3$ represents the fourth higher order modulation symbol.

13. A non-transitory computer-readable medium having instructions stored therein, which when executed by a processor, cause the processor to perform operations, the operations comprising:
   modulating information bits to be sent according to a lower order constellation diagram, and generating 4 m lower order modulation symbols, wherein m is an integer greater than or equal to 1;
   separately multiplying a precoding matrix Q by a column vector comprising every four lower order modulation symbols in the 4 m lower order modulation symbols, to obtain 4 m higher order modulation symbols to be sent corresponding to a higher order constellation diagram; and
   sending the 4 m higher order modulation symbols on different carriers of two antennas respectively to a receiving apparatus.

14. The non-transitory computer-readable medium according to claim 13, wherein the 4 m higher order modulation symbols are classified into four types, including a first higher order modulation symbol, a second higher order modulation symbol, a third higher order modulation symbol, and a fourth higher order modulation symbol, wherein the first higher order modulation symbol includes a $4(i-1)+1_{th}$ higher order modulation symbol, the second higher order modulation symbol includes a $4(i-1)+2_{th}$ higher order modulation symbol, the third higher order modulation symbol includes a $4(i-1)+3_{th}$ higher order modulation symbol, and the fourth higher order modulation symbol includes a $4(i-1)+4^{th}$ higher order modulation symbol, wherein $1 \leq i \leq l$, and i is an integer.

15. The non-transitory computer-readable medium according to claim 14, wherein sending the 4 m higher order modulation symbols on different carriers of two antennas comprises:
   sending the first higher order modulation symbol on a first subcarrier of a first transmit antenna of the two antennas;
   sending the second higher order modulation symbol on a first subcarrier of a second transmit antenna of the two antennas;
   sending the third higher order modulation symbol on a second subcarrier of the first transmit antenna; and
   sending the fourth higher order modulation symbol on a second subcarrier of the second transmit antenna.

16. The non-transitory computer-readable medium according to claim 14, wherein separately multiplying a precoding matrix Q by a column vector comprises:

multiplying a precoding matrix $$Q = \frac{1}{\sqrt{85}} \begin{bmatrix} 8 & 4 & -2 & 1 \\ 4 & -8 & 1 & 2 \\ 2 & 1 & 8 & -4 \\ 1 & -2 & -4 & -8 \end{bmatrix}$$

by a column vector $[s_0 \ s_1 \ s_2 \ s_3]^T$ comprising four quadrature phase shift keying (QPSK) symbols, to obtain four 256QAM modulation symbols corresponding to a 256 quadrature amplitude modulation (QAM) constellation diagram and $[x_0 \ x_1 \ x_2 \ x_3]^T$ respectively, wherein $x_0$ represents the first higher order modulation symbol, $x_1$ represents the second higher order modulation symbol, $x_2$ represents the third higher order modulation symbol, $x_3$ represents the fourth higher order modulation symbol, and $[\ ]^T$ represents transpose.

17. The non-transitory computer-readable medium according to claim 14, wherein the separately multiplying a precoding matrix Q by a column vector comprises:

multiplying a precoding matrix $$Q = \frac{1}{2} \begin{bmatrix} 1 & 1 & 1 & e^{j0.25\pi} \\ 1 & 1 & -1 & -e^{j0.25\pi} \\ 1 & -1 & -1 & e^{j0.25\pi} \\ 1 & -1 & 1 & -e^{j0.25\pi} \end{bmatrix}$$

by a column vector $[s_0 \ s_1 \ s_2 \ s_3]^T$ comprising four QPSK symbols, to obtain four 128QAM modulation symbols corresponding to a 128QAM constellation diagram and $[x_0 \ x_1 \ x_2 \ x_3]^T$ respectively, wherein $x_0$ represents the first higher order modulation symbol, $x_1$ represents the second higher order modulation symbol, $x_2$ represents the third higher order modulation symbol, $x_3$ represents the fourth higher order modulation symbol, and $[\ ]^T$ represents transpose.

18. The non-transitory computer-readable medium according to claim 14, wherein the separately multiplying a precoding matrix Q by a column vector comprises:

multiplying a precoding matrix $$Q = \frac{1}{\sqrt{2}} \begin{bmatrix} 1 & j & 0 & 0 \\ 0 & 0 & 1 & -j \\ 1 & -j & 0 & 0 \\ j & 1 & 0 & 0 \end{bmatrix}$$

by a column vector $[s_0 \ s_1 \ s_2 \ s_3]^T$ comprising four BPSK symbols, to obtain four modulation symbols corresponding to a QPSK constellation diagram and $[x_0 \ x_1 \ x_2 \ x_3]^T$ respectively, wherein $x_0$ represents the first higher order modulation symbol, $x_1$ represents the second higher order modulation symbol, $x_2$ represents the third higher order modulation symbol, and $x_3$ represents the fourth higher order modulation symbol.

* * * * *